US012304502B2

(12) United States Patent
Fields et al.

(10) Patent No.: US 12,304,502 B2
(45) Date of Patent: *May 20, 2025

(54) ASSESSING DRIVER ABILITY TO OPERATE AN AUTONOMOUS VEHICLE

(71) Applicant: STATE FARM MUTUAL AUTOMOBILE INSURANCE COMPANY, Bloomington, IL (US)

(72) Inventors: Brian Mark Fields, Phoenix, AZ (US); Leo Nelson Chan, Normal, IL (US); Kristopher Keith Gaudin, Bloomington, IL (US); Aaron Williams, Congerville, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/380,558

(22) Filed: Oct. 16, 2023

(65) Prior Publication Data

US 2024/0043015 A1 Feb. 8, 2024

Related U.S. Application Data

(63) Continuation of application No. 17/465,614, filed on Sep. 2, 2021, now Pat. No. 11,787,417, which is a
(Continued)

(51) Int. Cl.
*G08B 23/00* (2006.01)
*B60W 40/09* (2012.01)
(Continued)

(52) U.S. Cl.
CPC ............ *B60W 40/09* (2013.01); *B60W 50/12* (2013.01); *B60W 50/14* (2013.01); *G06Q 40/08* (2013.01);
(Continued)

(58) Field of Classification Search
CPC ...... B60W 40/09; B60W 50/12; B60W 50/14; B60W 2040/0809; B60W 2040/0818;
(Continued)

(56) References Cited

U.S. PATENT DOCUMENTS 9,373,203 B1 6/2016 Fields et al.
9,830,748 B2 11/2017 Rosenbaum
(Continued)

FOREIGN PATENT DOCUMENTS

EP 3239686 A1 11/2017
EP 3578433 B1 8/2020
(Continued)

*Primary Examiner* — Anh V La
(74) *Attorney, Agent, or Firm* — MARSHALL, GERSTEIN & BORUN LLP

(57) ABSTRACT

A computer-implemented method of assessing driver capability for operating an autonomous vehicle includes identifying a human operator of the autonomous vehicle, the human operator being associated with a driving capability profile. The method further includes signaling to the human operator with the signal, the signal requesting a response from the human operator. The method also includes updating, based on the response from the human operator to the signal, the driving capability profile to indicate a level of skill of the human operator at responding to the signal.

20 Claims, 14 Drawing Sheets

Related U.S. Application Data continuation of application No. 16/806,708, filed on Mar. 2, 2020, now Pat. No. 11,136,042, which is a continuation of application No. 15/957,723, filed on Apr. 19, 2018, now Pat. No. 10,618,523.

(51) Int. Cl.

| | | |
|---|---|---|
| *B60W 50/12* | (2012.01) | |
| *B60W 50/14* | (2020.01) | |
| *G06Q 40/08* | (2012.01) | |
| *G06V 20/59* | (2022.01) | |
| *B60W 40/08* | (2012.01) | |

(52) U.S. Cl.
CPC ... *G06V 20/597* (2022.01); *B60W 2040/0809* (2013.01); *B60W 2040/0818* (2013.01); *B60W 2040/0872* (2013.01); *B60W 2555/20* (2020.02)

(58) Field of Classification Search
CPC ..... B60W 2040/0872; B60W 2555/20; B60W 60/00182; B60W 60/005; G06Q 40/08; G06V 20/597
USPC ............ 340/576, 575, 457, 435, 573.1, 439; 701/23
See application file for complete search history.

(56) References Cited

U.S. PATENT DOCUMENTS

| | | |
|---|---|---|
| 9,990,782 B2 | 6/2018 | Rosenbaum |
| 10,083,588 B1 | 9/2018 | Kapoor et al. |
| 10,235,122 B1 | 3/2019 | Goel et al. |
| 10,269,190 B2 | 4/2019 | Rosenbaum |
| 10,467,824 B2 | 11/2019 | Rosenbaum |
| 10,618,523 B1 | 4/2020 | Fields et al. |
| 10,776,644 B1 | 9/2020 | Zhang et al. |
| 11,136,042 B1 | 10/2021 | Fields et al. |
| 11,227,452 B2 | 1/2022 | Rosenbaum |
| 11,407,410 B2 | 8/2022 | Rosenbaum |
| 11,524,707 B2 | 12/2022 | Rosenbaum |
| 11,594,083 B1 | 2/2023 | Rosenbaum |
| 11,787,417 B2 * | 10/2023 | Fields ................. B60W 40/09 340/576 |
| 2011/0043350 A1 | 2/2011 | Ben David |
| 2014/0218187 A1 | 8/2014 | Chun et al. |
| 2015/0088541 A1 | 3/2015 | Yao |
| 2016/0117928 A1 | 4/2016 | Hodges et al. |
| 2016/0209840 A1 | 7/2016 | Kim |
| 2017/0248952 A1 * | 8/2017 | Perkins ................ G05D 1/0061 |
| 2017/0364070 A1 | 12/2017 | Oba |
| 2018/0043906 A1 | 2/2018 | Huang et al. |
| 2018/0060970 A1 | 3/2018 | Oduor et al. |
| 2018/0194280 A1 | 7/2018 | Shibata et al. |
| 2018/0284764 A1 | 10/2018 | Asghar et al. |
| 2022/0092893 A1 | 3/2022 | Rosenbaum |
| 2022/0340148 A1 | 10/2022 | Rosenbaum |
| 2023/0060300 A1 | 3/2023 | Rosenbaum |

FOREIGN PATENT DOCUMENTS

| | | |
|---|---|---|
| EP | 3730375 B1 | 10/2021 |
| EP | 3960576 A1 | 3/2022 |
| EP | 4190659 A1 | 6/2023 |
| EP | 4190660 A1 | 6/2023 |

\* cited by examiner

ASSESSING DRIVER ABILITY TO OPERATE AN AUTONOMOUS VEHICLE

CROSS-REFERENCE TO RELATED APPLICATIONS

This application is a continuation of U.S. patent application Ser. No. 17/465,614, filed Sep. 2, 2021, which is a continuation of U.S. patent application Ser. No. 16/806,708, filed Mar. 2, 2020, which is a continuation of U.S. patent application Ser. No. 15/957,723, filed Apr. 19, 2018, which are hereby incorporated by reference in their entirety.

BACKGROUND

Vehicles may be equipped with sensors for processing and communication capabilities that allow the vehicle to navigate autonomously without human intervention. Autonomous vehicle navigation is not possible, however, under all circumstances. In some situations, a vehicle may lack the capability to navigate autonomously such as adverse or extreme weather conditions, in the event of the loss of vehicle sensors or a communications link, under disaster conditions, due to vehicle collisions in the area, etc. When a vehicle can no longer navigate autonomously, control of the vehicle may be returned to a human operator. Transfer of control of the vehicle to a human represents a potential danger due to the vehicle's autonomous nature—a human operator who has been traveling in the vehicle may be inattentive to road conditions and unprepared to make the decisions and exercise the motor control needed to safely operate the vehicle. Human operators will differ in their ability to operator an autonomous vehicle, especially when accepting increased driving responsibilities, and therefore present varying levels of risk in operating autonomous vehicles.

SUMMARY OF THE DISCLOSURE

This summary is provided to introduce a selection of concepts in a simplified form that are further described in the Detailed Descriptions. This summary is not intended to identify key features or essential features of the claimed subject matter, nor is it intended to be used to limit the scope of the claimed subject matter.

Systems and methods are disclosed for assessing driver capability for operating an autonomous vehicle. Human operators of autonomous vehicles may exhibit varying levels of operating proficiencies and may respond differently to changing road conditions or requests from the vehicle to assume more or less control over navigation. A system for assessing driver capability of an autonomous vehicle assesses human operator capabilities in a variety of circumstances to assemble a driving capability profile of the human operator. The autonomous vehicle may rely on the driving capability profile as well as an environmental profile and human operator parameters describing the environment surrounding the vehicle and an alertness level of the human operator, respectively. The vehicle may condition requests to increase or decrease driving responsibilities of the human operator depending on the driving capability profile in combination with the environmental profile and/or the human operator parameters. An insurer may condition an insurance premium cost for a time period based on the driving capability profile in combination with the environmental profile and/or the human operator parameters.

In one aspect, a method is disclosed for assessing driver capability for operating an autonomous vehicle. The method may include identifying a human operator of the autonomous vehicle, the human operator being associated with a driving capability profile; signaling to the human operator with a signal requesting a response from the human operator; and updating the driving capability profile based on the response from the human operator to indicate a level of skill of the human operator at responding to the signal.

In another aspect, a computer system is provided for assessing driver capability for operating an autonomous vehicle. The system may include one or more processors and a non-transitory computer-readable memory coupled to the one or more processors and storing instructions thereon. When executed by the one or more processors, the instructions cause the computer system to: identify a human operator of the autonomous vehicle, the human operator being associated with a driving capability profile; signal to the human operator with a signal, the signal requesting a response from the human operator; and update, based on the response from the human operator to the signal, the driving capability profile to indicate a level of skill of the human operator at responding to the signal.

In yet another aspect, a method of insuring an autonomous vehicle against loss is disclosed. The method may include: receiving, by one or more processors, a driving capability profile of a human operator of the autonomous vehicle; receiving a response from the human operator to a signal, the signal presented to the human operator and requesting a response from the human operator; updating, based on the response from the human operator to the signal, the driving capability profile to indicate a level of skill of the human operator at responding to the signal; determining a risk of insuring the autonomous vehicle, the risk being based at least in part on the updated driving capability profile; and transmitting an insurance offer to an electronic device associated with the human operator, the insurance offer being based at least in part on the determined risk of insuring the autonomous vehicle.

The methods may be implemented via computer systems, and may include additional, less, or alternate actions or functionality. Systems or computer-readable media storing instructions for implementing all or part of the method described above may also be provided in some aspects. Systems for implementing such methods may include one or more of the following: a special-purpose computing device, a personal electronic device, a mobile device, a wearable device, a processing unit of a vehicle, a remote server, one or more sensors, one or more communication modules configured to communicate wirelessly via radio links, radio frequency links, and/or wireless communication channels, and/or one or more program memories coupled to one or more processors of the personal electronic device, processing unit of the vehicle, or remote server. Such program memories may store instructions to cause the one or more processors to implement part or all of the method described above. Additional or alternative features described herein below may be included in some aspects.

This summary is provided to introduce a selection of concepts in a simplified form that are further described in the Detailed Descriptions. This summary is not intended to identify key features or essential features of the claimed subject matter, nor is it intended to be used to limit the scope of the claimed subject matter.

Advantages will become more apparent to those of ordinary skill in the art from the following description of the preferred aspects, which have been shown and described by way of illustration. As will be realized, the present aspects may be capable of other and different aspects, and their details are capable of modification in various respects. Accordingly, the drawings and description are to be regarded as illustrative in nature and not as restrictive.

DETAILED DESCRIPTIONS

Figure 1:
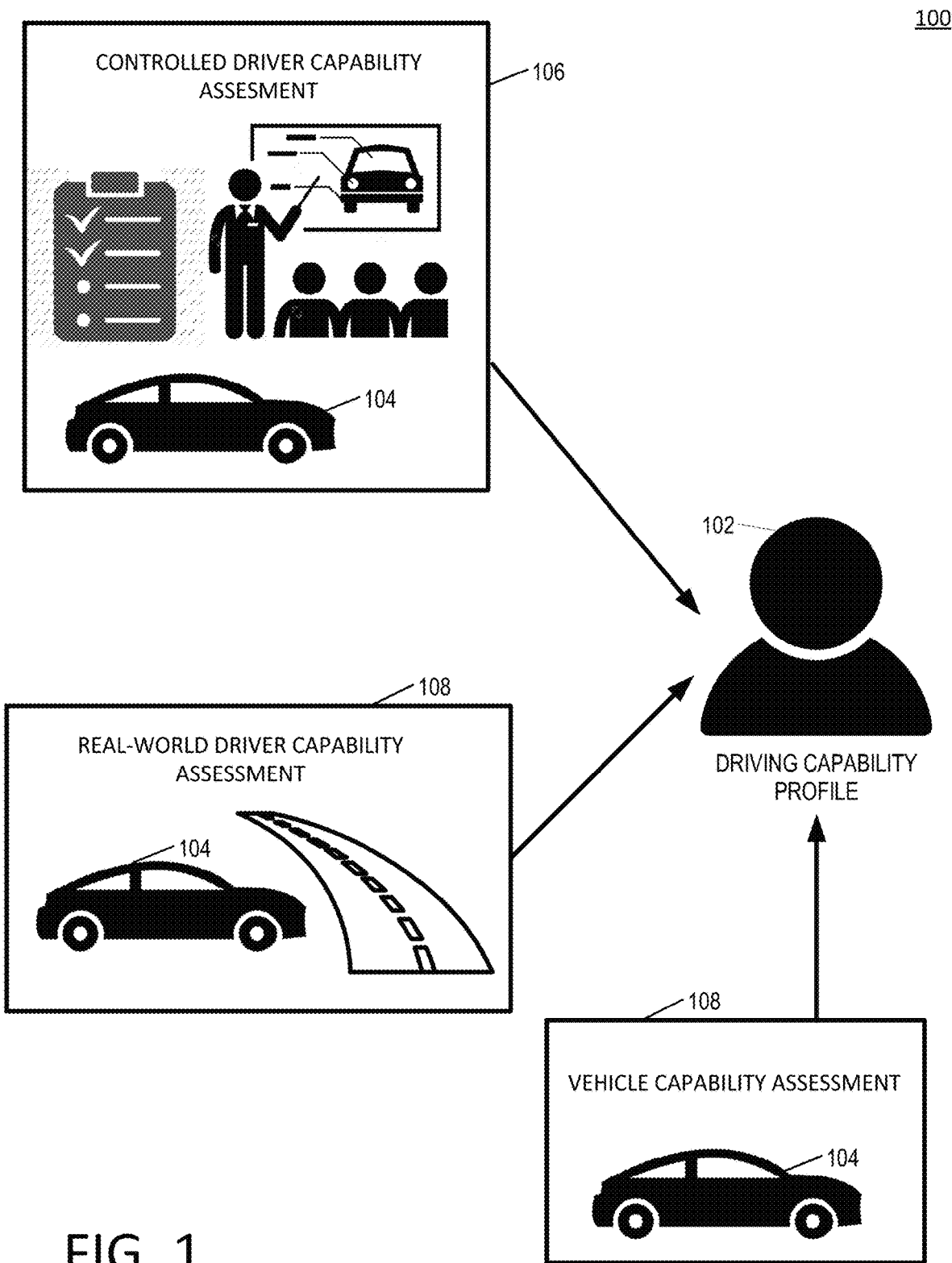
FIG. 1 is a schematic diagram of an example system for assessing driver ability to operate an autonomous vehicle.

Autonomous vehicles may exercise a range of capabilities when navigating on open road conditions. An autonomous vehicle need not be viewed as operating purely autonomously or purely manually. The Society of Automotive Engineers (SAE) has identified at least six levels of autonomous vehicle capability ranging from no driving automation (Level 0) to full automation (Level 5). As a vehicle moves up the levels of capability, additional autonomous competencies are added to the vehicle's set of skills (e.g., adaptive cruise control, parking assist, lane assist, traffic jam assist, conditional automation, high automation, full automation, etc.).

At the various points on the vehicle's autonomous capability ladder, a human operator exercises an appropriate level of manual control. If a vehicle supplies only adaptive cruise control or parking assist capabilities, then the human operator must exercise a high level of manual control and is responsible for any and all non-autonomous aspects of the vehicle. If a vehicle supplies high or full automation, on the other hand, a human operator may participate at a low level, or even not at all, in navigating the vehicle. If a vehicle exercises a high level of autonomous capability (e.g., Levels 4 or 5), a human operator may become disengaged from the road and unaware of the road environment surrounding the vehicle. The human user may become focused on non-driving tasks (e.g., reading, working, playing games, conversations with other passengers, phone calls, etc.). A human operator may even go to sleep and lose all contact with controlling the vehicle.

It may be desirable for an autonomous vehicle to shift from one level of autonomous capability to another, such as due to changing road conditions, weather conditions, due to a vehicle crash, disaster or emergency situation, etc. To the extent the human operator will need to change her involvement in piloting the vehicle when the vehicle shifts between levels of automation, she must be notified of the impending change. A variety of notification types are used in the system for manual control re-engagement to communicate with the human operator regarding upcoming changes in the human operator's responsibilities in piloting the vehicle. A notification may be more intrusive to the human operator or less intrusive to the human operator depending on the urgency of the impending change to the vehicle's capabilities and the human operator's responsibilities.

Different human operators will respond differently to notifications of changes to the vehicle's autonomous capabilities. Human operators exhibit differences from one another in terms of attention span, ability to multitask, ability to shift focus from one activity to another after receiving a notification, etc. To some extent, these differences are natural characteristics of the human operators themselves (e.g., some people are more likely than others to become engrossed in reading a book and may take more time to respond to a notification of impending vehicle autonomous capability change than other people who may tend not to become engrossed in reading a book while riding in a car). In other situations, a human operator's ability to acknowledge a notification and prepare to exercise more or less control over the vehicle may depend on other aspects of the human operator that may change over time (e.g., intoxication level, how well rested the human operator is, whether the human operator has become focused on another activity or remains aware of the vehicle's surroundings, the health of the human operator, etc.). In yet other situations, a human operator's ability to acknowledge a notification and prepare to exercise more or less control over the vehicle may change slowly over time (e.g., a human operator's eyesight may deteriorate over time, motor control deteriorates with age, etc.).

A change to a vehicle's autonomous capability may also have a variable time target in which the change should be made. Some changes to a vehicle's autonomous capabilities must be made quickly, such as in emergency situations (e.g., a vehicle crash or other rapidly approaching road hazard, if the human operator experiences an emergent medical or health problem, etc.). Other changes to a vehicle's autonomous capabilities need not be made quickly (e.g., if adverse or extreme weather conditions are forecasted but not yet experienced, if a human operator is nearing the limits of her ability to stay awake, if a human operator experiences abnormal but not threatening health issues, etc.).

A vehicle may receive an indication from third-party sources of an impending road hazard and may determine the urgency of altering the vehicle's autonomous capabilities on its own. Vehicles may communicate wirelessly with one another to relay updates to one another regarding changing road conditions as experienced by the vehicles themselves.

The vehicles may communicate according to a peer-to-peer network in which the vehicles connect with one another directly (e.g., a swarm) or a centralized party may collect information from the vehicles, optionally process the information, and selectively provide relevant information to vehicles as the vehicles need it (e.g., client/server). For example, if a vehicle crash occurs on a road and vehicles in the vicinity detect the crash occurrence, the vehicle in the vicinity of the crash may communicate an emergency signal to vehicles approaching the crash site on the road such that those vehicles may take precautions to avoid crashing into any vehicles that are slow, stopped, or otherwise navigating differently than expected due to the crash.

In another implementation, a vehicle may receive an indication from a third-party that the vehicle should alter its autonomous capabilities and may receive a target time period in which to make the change therewith. A centralized authority (e.g., a weather prediction bureau, an insurer, a vehicle owner, a government agency, etc.) may determine that a change should be made to a vehicle's autonomous capabilities based on information regarding the vehicle's environment and may communicate a request to make the change to the vehicle. Such a request may accompany a target time in which to make the change to the vehicle's capabilities.

A vehicle may adjust its autonomous capabilities to increase or decrease the number of autonomous capabilities, depending on the situation the vehicle is in. In some situations, the vehicle may be ill-suited to safely navigate a situation autonomously, and manual control may be preferable (e.g., navigation in close quarters with other vehicles wherein human communication is needed to coordinate with the operators of other vehicles, if the vehicle experiences a sensor or other hardware failure, if the vehicle loses a communications link, etc.). In other situations, a human operator may be more ill-suited to safely navigate a situation than the vehicle would be autonomously. It may be known that human operators in general, or a specific human operator, is likely to make a mistake that could lead to a crash that an autonomously controlled vehicle would not make. For example, if a vehicle is traveling at a high rate of speed in low visibility conditions (e.g., heavy fog, frequent road elevation changes, blind spots, etc.) and is approaching a sudden traffic jam wherein other vehicles are traveling at a comparatively much slower rate of speed or are stopped on a road, it may be known that human operators are less likely to reduce speed in time than an autonomous vehicle would be. If the vehicle detects such a road condition approaching, it may request the human operator relinquish some or all control of the vehicle to reduce risk of a vehicle crash.

Human operators may be assessed to determine a level of capability for operating an autonomous vehicle is possessed by the human operator. A level of capability may include more than a scalar value representing the human operator's overall capability. Instead, the capability of a human operator in operating an autonomous vehicle may be represented by a driving capability profile that integrates information from a variety of sources and may evaluate the human operator in a variety of conditions. For example, some human operators may be more adept at operating the autonomous vehicle in adverse weather conditions (e.g., night driving, snow, rain, heavy winds, etc.) than other human operators. A driving capability profile may evaluate other aspects of a human operator as well. Some human operators may be more inclined to focus their attention on objects other than the environment surrounding the vehicle, such as on a book, electronic device, daydreaming, etc. Such a human operator may require more time to acclimate to increased driving responsibilities, should she be called on to exercise them. A driving capability profile may take into account human operator parameters, which are variable parameters regarding the human operator that may be detected by the vehicle or inferred from other information (e.g., driving history, driving habits, etc.). Human operator parameters may include the human operator's body position, aspects of the human operator's body (e.g., heart rate, body temperature, eye movements, etc.) that have a bearing on the human operator's autonomous vehicle operating capabilities. For example, a human operator who normally responds quickly to requests for increased driving responsibility may not respond quickly if current human operator parameters indicate that she is drowsy.

FIG. 1 is a schematic diagram of an example system 100 for assessing driver ability to operate an autonomous vehicle. The system 100 assesses a human operator 102 of a vehicle 104 in a variety of manners to assemble a driving capability profile for the human operator 102. In one implementation, a controlled driver capability assessment 106 may collect driving capability profile information regarding the human operator 102. A controller driver capability assessment 106 may include a classroom examination of the human operator 102 (e.g., testing knowledge of rules of the road, vehicle operation, etc.) as well as controlled driving conditions (e.g., closed track). A human operator may be evaluated in controlled driving conditions by observers and/or information regarding the human operator's performance may be collected electronically.

In another implementation, the system 100 assesses the human operator 102 in real-world driving conditions 108. Real world driving conditions 108 are likely to capture a wider variety of conditions than controlled driver assessment 106 and are likely to capture driving behavior that the human operator 102 may be unlikely to engage in while she knows she is under supervision (e.g., bad driving habits, excessive risk taking, etc.). The vehicle 104 may collect human operator parameters regarding the human operator 102. The human operator parameters collected in real-world driver capability assessment 108 may also include non-visual data collected from the interior of the vehicle 102. In at least one implementation, non-visual data includes biometric data of the human operator (e.g., heart rate, breathing rate, body temperature, perspiration rate, etc.). Biometric data may be collected via the seat in the vehicle 104 because the seat is in physical contact with the human operator 102, which facilitates the collection of various types of biometric data. For example, a sensor may be embedded in the seat such that the sensor can collect relevant data (e.g., a thermometer, a heart rate sensor, a breathing rate sensor, a perspiration sensor, etc.). A driver capability profile for human operator 102 may be updated with information gleaned from the real-world driver capability assessment 108 to reflect the propensity of a particular human operator to respond effectively to the various road conditions encountered when the human operator is in the various measured states of alertness.

Another aspect of the driving capability profile of the human operator 102 is a vehicle capability assessment 108. Vehicles may differ in various ways that affect the ability of the vehicle to avoid road hazards in cooperation with a human operator. For example, vehicles may be capable of various levels of autonomous control or may have more or less sophisticated implementations of a certain level of autonomous control (e.g., quality of the vehicle's road sensors and processing abilities to determine a best or safest course of action in response to a road hazard). Another way vehicles differ from one another is the notifications that the vehicle is capable of displaying to the human operator in the event of a change to the autonomous capabilities of the vehicle. Some vehicles may display notifications that are not as effective in attracting the attention of a human operator as other notifications. Some vehicles may incorporate notification aspects including haptic feedback, audio feedback, heads-up displays, screen displays, etc. to increase the effectiveness of a notification on the human driver. Some vehicle are capable of choosing a more intrusive or less intrusive type of notification depending on which is more appropriate in view of a potential road hazard. Vehicles equipped with these capabilities may be less likely to incur a loss that other vehicles that lack the capabilities when traveling with human operators of the same driving capability.

Figure 2:
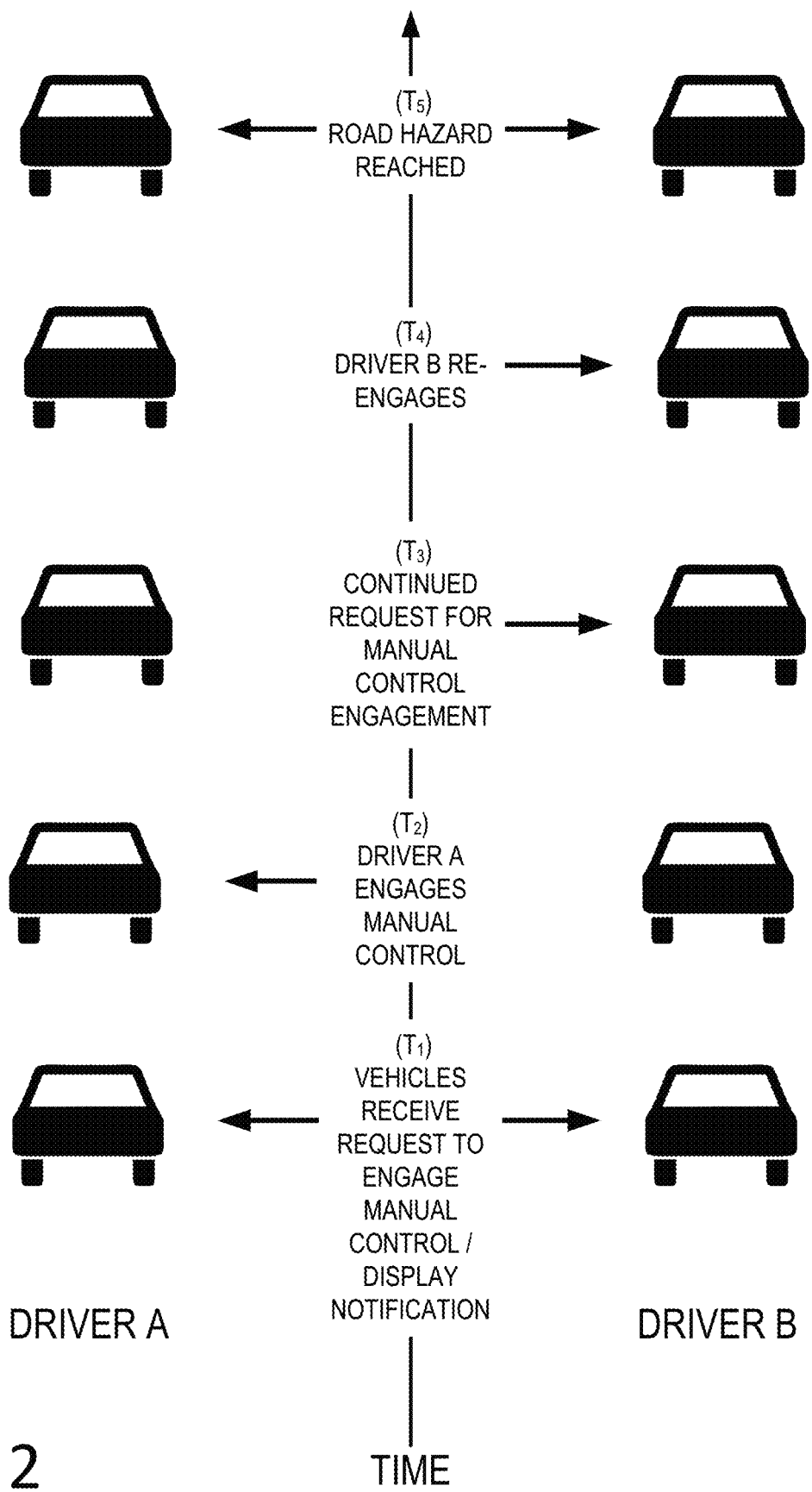
FIG. 2 is a time-series schematic diagram of an example system for assessing driver ability to operate an autonomous vehicle.

FIG. 2 is a time-series schematic diagram of an example system 200 for assessing driver ability to operate an autonomous vehicle. The two drivers are designated in FIG. 2 as Driver A and Driver B. Drivers A and B are shown in a time progression from time $T_1$ to time $T_5$ in the process of engaging manual control of their respective vehicles. Both of the vehicles of Drivers A and B are vehicles that have some level of autonomous capabilities and may be shifted up or down among levels of autonomous capability to add or remove autonomous competencies to the set of autonomous capabilities exercised by the vehicle at a point in time.

At a time $T_1$, the vehicles of Drivers A and B receive a request to engage manual control in their respective vehicles. The request to engage manual control may originate from a security arbiter on the vehicles that makes autonomous capability decisions based on human operator parameters detected from observing the human operators (e.g., Driver A and Driver B) in the vehicles, road condition data (e.g., relayed from other vehicles, received from a monitoring party, based on local vehicle diagnostic data, etc.), and/or data regarding the human operators themselves (e.g., driving history, demographic data, insurance coverage data, etc.). In another implementation, the request to engage manual control may originate from another party with an interest in the vehicle and/or the occupants therein (e.g., a vehicle owner, a vehicle manufacturer, an insurer, a law enforcement or other government agency, etc.). Also at time $T_1$, the vehicles of Drivers A and B display a notification requesting to engage manual control to the human operators of the vehicles. The notification may be displayed by a notification server on the vehicle that displays a notification as specified by a security arbiter on the vehicle.

At a time $T_2$, Driver A engages manual control. Various metrics may be used to determine when a human operator has successfully completed an engagement of manual control. Some metrics may be human operator parameters sensed or detected by the vehicle. For example, a camera disposed inside the vehicle may focus on a human operator's eyes and eye movements to determine whether the human operator's attention is focuses on road conditions and the environment surrounding the vehicle or if the human operator's attention is focused on objects inside the vehicle. A human operator's eye movements may also indicate whether the human operator is frequently checking mirrors (e.g., rear-view mirror, side mirrors) and whether the eye movement patterns match known patterns of attentive driving. Successful completion of manual control engagement may also be detected by interactions of the human operator with the controls of the vehicle (e.g., operating the pedals, moving the steering wheel, shifting gears, etc.).

At a time $T_3$, Driver A has engaged manual control but Driver B has not. In one implementation, the vehicle displays a continued request for manual control engagement of Driver B. The continued request for manual control engagement of Driver B may include more or different elements such as lights, haptic feedback, a text message, sound instructions or alarms, etc. At a time $T_4$, Driver B engages manual control, and at time $T_5$, when the vehicles reach the road hazard, both are under manual control.

As illustrated in the example of FIG. 2, different individual human operators respond differently to notifications to engage manual control of a vehicle (or to change a level of autonomous capability of a vehicle). In at least one implementation, Driver A and Driver B both exhibit detected human operator parameters (level of engagement in another activity, health status, etc.) that indicate a similar level of alertness. Nevertheless, the two drivers respond differently to a notification to increase driving responsibility and take a different amount of time before they are able to engage manual control of the vehicle (from $T_1$-$T_2$ for Driver A in comparison to $T_1$-$T_4$ for Driver B). These differences in reaction time may be recorded in a driving ability profile of each of the two drivers and included in the human operator parameters relied upon to determine when to transition control of the vehicle, what types of alerts to use to notify the human operators of an impending change in driving responsibility, and how long the human operators are expected to need to successfully engage manual control.

Figure 3:
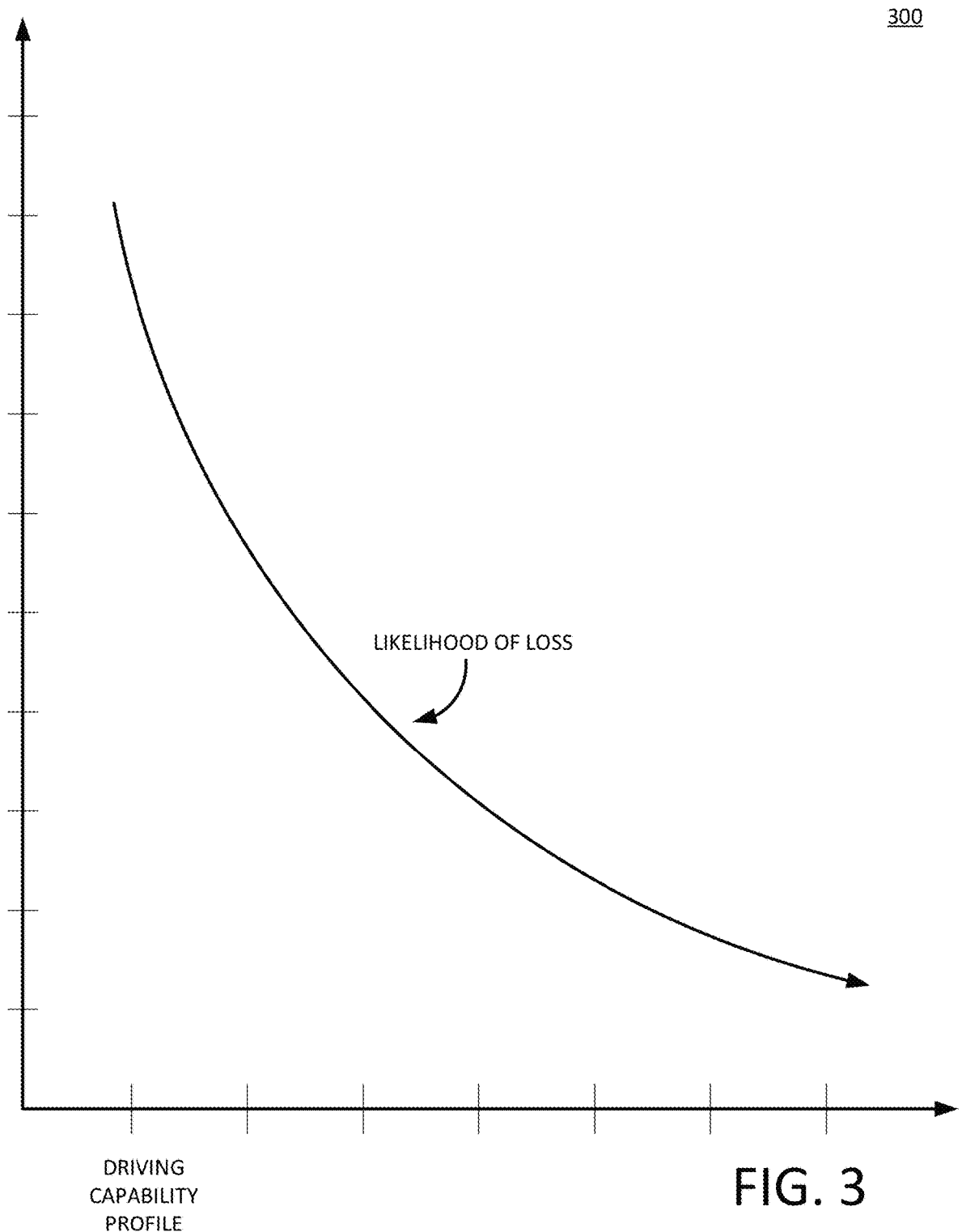
FIG. 3 is a plot of likelihood of loss against driving capability profile in an example system for accessing driver ability to operate an autonomous vehicle.

FIG. 3 is a plot 300 of likelihood of loss against driving capability profile in an example system for accessing driver ability to operate an autonomous vehicle. The x-axis of plot 300 indicates a rising driving capability profile and the y-axis of plot 300 indicates a likelihood of loss. As driving capability profile increases along the x-axis, the likelihood of loss to the vehicle being operated by the human operator falls. The plot 300 may also depend on factors including an environmental profile of the vehicle and/or human operator parameters of the human operator at a certain point in time. In other words, a human operator's driving capability profile, and thus the plot 300 corresponding to the particular human operator, may shift depending on whether the human operator's alertness level and skill in navigating the environment in which the vehicle is located at a certain point in time (e.g., an alert driver who is nervous about driving in a snowstorm may score differently than a distracted driver who is very experienced in snow driving conditions).

Figure 4:
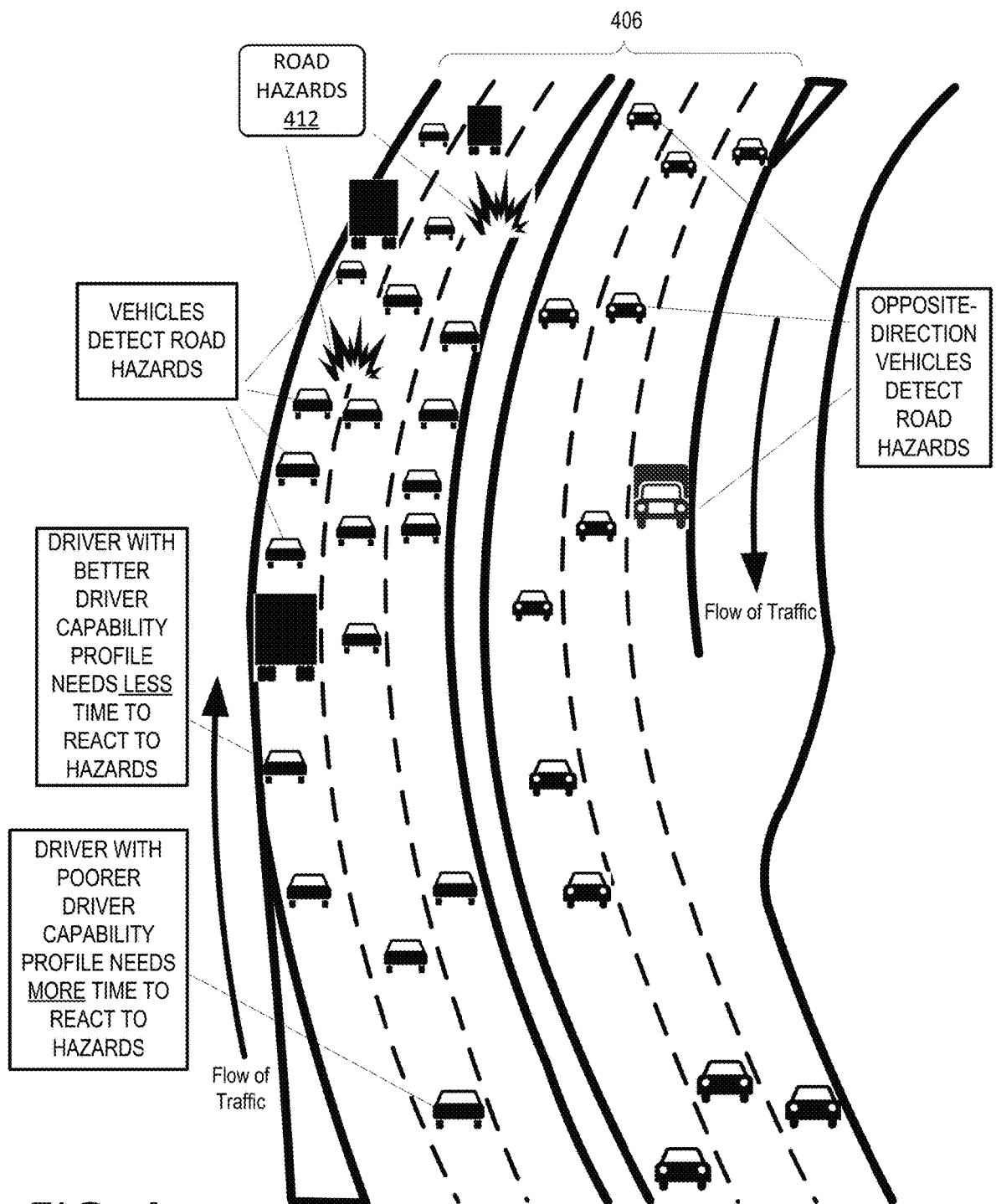
FIG. 4 is a schematic diagram of road hazards on a road carrying autonomously navigated vehicles.

FIG. 4 is a schematic diagram 400 of road hazards 412 on a road 406 carrying autonomously navigated vehicles. Under some circumstances, it may be safer for a vehicle on road 406 to alter available autonomous capabilities to more safely navigate the road hazards 412. To make a determination whether it is safer to alter autonomous vehicle capabilities or to remain in the status quo, the vehicle detects a variety of human operator parameters regarding a human operator of the vehicle to determine a human operator alertness level. An amount of time needed to alert a human operator of a vehicle to increase driving responsibilities regarding navigation of road hazards 412 depends in part on the driving capability profiles of the various human operators of the vehicles on road 406. Also relevant to a determination of whether it is safer to alter autonomous vehicle capabilities of the vehicle on road 406 is an assessment of conditions on the road 406 and of the road hazards 412.

The vehicles on road 406 include components for managing a transition from one level of autonomous capabilities to another level of autonomous capabilities. One type of component to manage the transition is an evaluator in the vehicles to evaluator to evaluate readiness of a human operator of a vehicle including one or more sensors. A security arbiter in the vehicles determines a security risk to the vehicle (e.g., a road hazard, adverse conditions, diminished capacity of a human operator, etc.) and determines whether a level of autonomous capability of the vehicle should be adjusted by adding or removing autonomous capabilities and conversely adding or removing driving responsibility from a human operator. The security arbiter in the vehicle may receive human input parameters directly from the human operator and/or from a remote party.

In at least one implementation, the security arbiter in the vehicles evaluates a threat posed by the road hazards 412. The security arbiter may receive information regarding the threat from other road participants and remote parties. For example, vehicles closer to the road hazards 412 may wirelessly relay information back to other vehicles further from road hazards 412 and the other vehicles approaching the road hazards 412 on the other side of road 406 from the hazards. The security arbiter may receive indications, for example without limitation that the vehicles have encountered sharply lower road speeds or have observed adverse road conditions. The vehicles may further relay information regarding the location of the road hazards 412 on the road 406. The vehicles may include telematics data in the information sent to the security arbiter (e.g., heavy braking, high G-forces, etc.). As another example, third parties (e.g., government agencies, insurers, vehicle owners, etc.) may collect information regarding the conditions on the road 406 by way of remote sensors. The remote sensors may detect road speeds and be able to determine whether vehicles are in distress or if a dangerous condition has developed on the road 406. Remote sensors may be fixed in place roadside (e.g., vibration sensor, vehicle counter, camera, etc.) or may be mobile sensors (e.g., drone, unmanned aerial vehicle, helicopter, etc.).

After receiving data regarding the road hazards 412, the security arbiter may determine a security threat to the vehicle based on the road hazard 412 and other information available to the security arbiter. The security arbiter may further determine a change to autonomous vehicle capabilities that should be taken to improve safety when navigating the road hazard 412. Such a determination may be based on information available to the security arbiter or it may be an instruction received from a third party. The security arbiter may further determine a time period during which the change in the vehicle's autonomous capability should occur.

Another component in the vehicles is a notification server. The notification server in the vehicles may include hardware and software components (e.g., a display for text messages to a human operator inside the vehicle, speakers for playing audio text notifications and instructions, lights, feedback devices, an operating system, microphones, etc.) for presenting information to and receiving information from a human operator of the vehicles. The notifications presented to a human operator of the vehicles on road 406 depends in part on the driving capability profiles of the human operators of the various vehicles. A driver with a better driving capability profile for the conditions present on road 406 may need less time to react to a notification than a driver with a poorer driver capability profile for the conditions present on road 406. The notification server may therefore select a longer notification period time for the respective drivers based on the driving capability profile.

After receiving data regarding the road hazard 412, the security arbiter may select a time period during which the vehicle should transition to a different level of autonomous capability. The time period may be calibrated based on the speed of the vehicles on the road 406, the location of the road hazards 412, information received from vehicles, etc. In at least one implementation, the security arbiter may decrease speed of the vehicle to lengthen the time until the vehicle reaches the road hazard 412. In at least one implementation, the security arbiter provides a time period to the notification server of the vehicle during which changes to the vehicle's autonomous capabilities should be made. In implementations, a security arbiter requests the notification server to require human operator acknowledgement before implementing changes to the autonomous capabilities of the vehicle. In another implementation, the security arbiter will cease navigation of the vehicle if the human operator does not acknowledge increased driving responsibilities. In other implementations, the security arbiter implements a change in the autonomous capabilities of the vehicle.

Figure 5:
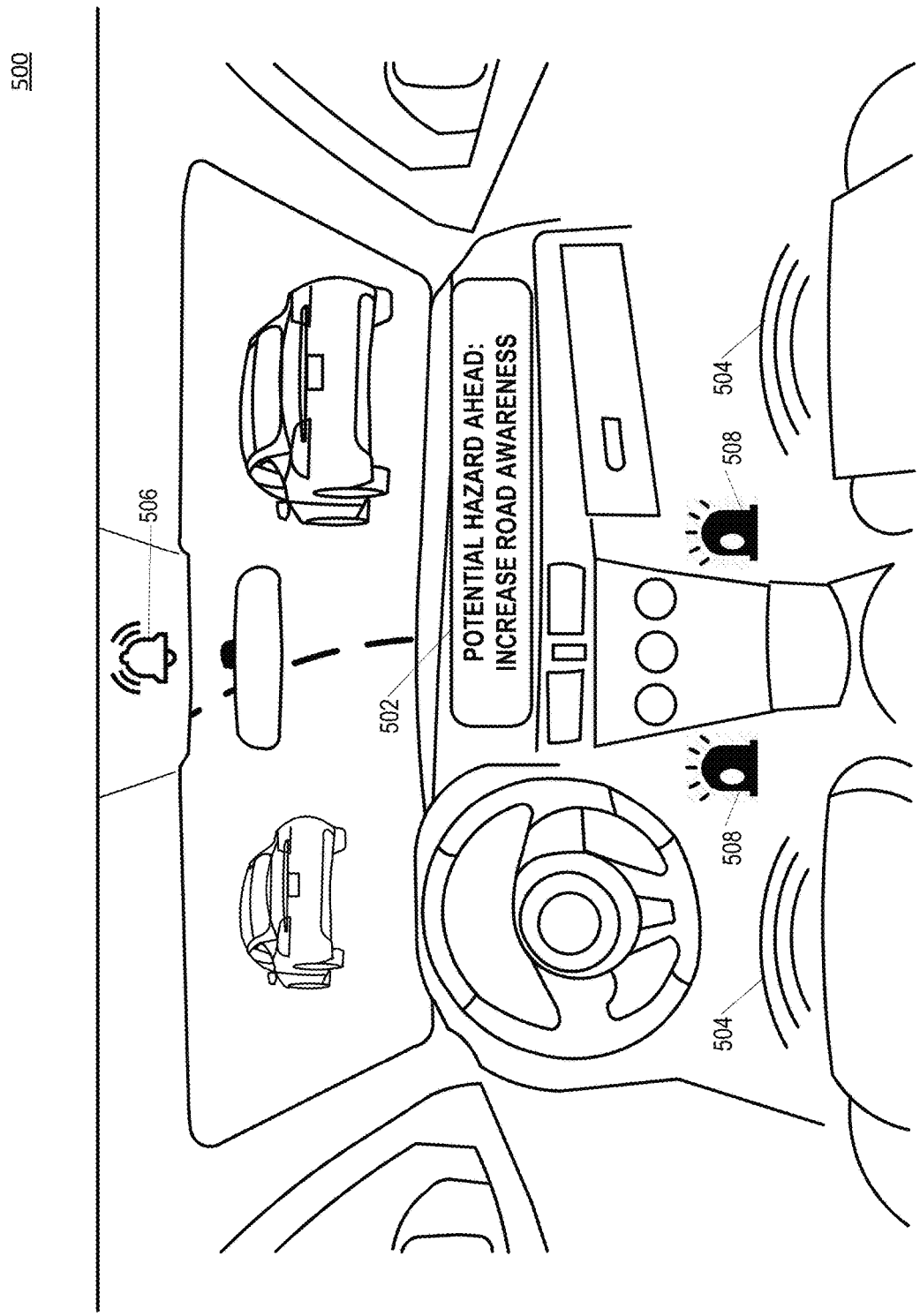
FIG. 5 is an in-vehicle view of an example system for assessing driver ability to react to road conditions and/or accept additional driving responsibilities.

FIG. 5 is an in-vehicle view of an example system 500 for assessing driver ability to react to road conditions and/or accept additional driving responsibilities. In the implementation illustrated in FIG. 5, a text notification 502 appears on the dashboard of the vehicle. In one implementation, the text notification 502 alerts a human operator of an impending change to the level of autonomous control exercised by the vehicle or (as illustrated in FIG. 5) simply a notification to increase awareness of road conditions in preparation for a potential change to autonomous capabilities. For example, if the vehicle or another entity has determined that a greater degree of autonomous control is better suited to the potential road hazard, then the text notification 502 may indicate to the human operator that the vehicle will include greater autonomous capability (and thus less human responsibility) to navigate the upcoming road hazard. The text notification 502 may include information regarding the road hazard or an impending shift of autonomous vehicle capabilities (e.g., whether the human operator is expected to exercise a greater or lesser degree of control, the urgency of the hazard or shift in capabilities, an expected time until the hazard is encountered or the shift in capabilities is executed, etc.).

In the case of a notification 502 that merely requests an increased level of awareness on the part of the human operator, such a notification may provide a "head start" on the process of transitioning some or all control from the vehicle to the human operator. In at least one implementation, the notification 502 is one of a cascade of notifications ranging from merely requesting increased awareness to transfer of full control to the human operator, with intermediate notifications for transfer of discrete autonomous capabilities to the human operator (e.g., braking but not steering, acceleration, deceleration, lane keeping, signaling, navigating, etc.). In another implementation, the notification 502 in accompanied by other changes to the environment inside the vehicle to assist the human operator in increasing awareness of the road conditions surrounding the vehicle (e.g., turning down music, interrupting video display, etc.).

The text notification 502 may be adjusted to be more intrusive or less intrusive to the human operator, depending on the nature of the road hazard or change in autonomous capabilities. If the vehicle is preparing to gain more control over navigation of the vehicle with a corresponding reduction in responsibility on the part of the human operator, then the notification 502 need not be highly intrusive because the notification 502 is more of an informational nature. On the other hand, if there is a problem with the vehicle's autonomous capabilities and the human operator is expected to take some or all responsibility for piloting the vehicle, then the notification 502 may be more intrusive to the human operator because the human operator must be made aware of the alert, which could involve interrupting another activity that the human operator may be engaged in (e.g., sleeping, reading, working, in conversation with another occupant of the vehicle, etc.). The text notification 502 may be made more or less intrusive to the human operator by changing text font, flashing text, increasing or decreasing brightness of the text notification 502, using colors to indicate urgency (e.g., red for high urgency, yellow or intermediate urgency, green for lower urgency, etc.).

In the implementation illustrated in FIG. 5, haptic feedback 504 may be used to notify a human operator of an impending road hazard or change in autonomous vehicle capabilities. Haptic feedback may emanate from haptic devices embedded in various parts of the interior of the vehicle such as in the vehicle seats, arm rests, headrests, vehicle and/or media control surfaces, etc. Haptic feedback signals 504 may accompany a text notification 504. Haptic feedback signals 504 may be used to make a notification more intrusive to a human operator. For example, if a human operator is deemed to be in a state of lowered attention span, such as when sleeping, reading a book, etc., then a haptic feedback signal 504 may assist in helping the human operator to "snap out" of her current state and to re-focus on the notification 502 and/or any road or vehicle conditions that require her attention.

Additionally, or alternatively, an audio alert 506 may be used to notify a human operator of an impending road hazard, an impending change in autonomous vehicle capabilities, or simply (as illustrated in FIG. 5) a notification to increase road awareness in the event that a change in autonomous driving capability is needed. An audio alert 506 may emanate from speakers located around the interior of the vehicle. Audio alert 506 may include sounds designed to attract the attention of a human operator and/or voice commands directed to the human operator. For example, a voice command in the audio alert 506 may instruct the human operator to prepare for an increase in driving responsibility or signal to the human operator how much time is left until the human operator will be expected to exercise more or less control over the vehicle. The audio alert 506 may be made more intrusive or less intrusive to a human operator by varying the volume of the audio alert 506, including a sound reflective of the urgency of impending changes to the human operator's responsibilities (e.g., an alarm sound for an urgent hazard, a soft voice or bell for a less urgent hazard, etc.).

In at least one implementation, the audio alert 506 includes a "keyword" that the human operator has been conditioned to respond to. For example, the human operator's name may be used as a signal to attract the human operator's attention. In another limitation, the keyword may be a warning word (e.g. "danger," "look out," "alert!") that the human operator may be conditioned to respond to. When the human operator hears the keyword, she is more likely to shift her attention away from other tasks and to focus on the road conditions surrounding the vehicle. A keyword may be more effective than a beep, bell, or other signal that the human operator is less likely to have been conditioned to respond to.

In at least one implementation, other visual alerts 508 are included to notify a human operator of an impending road hazard or impending change in autonomous vehicle capabilities. In one implementation, the visual alerts 508 include a light bulb (e.g., a light emitting diode) for flashing or steady illumination. In other implementations, the visual alerts 508 include an e-fabric display of images or colors on the interior of the vehicle (e.g., an alert symbol, a text message, a color indicating urgency, etc.). Like other alerting mechanisms in the vehicle, the visual alert 508 may be adjusted to be more intrusive or less intrusive to the human operation by varying the intensity of the alert (e.g., brightness of a light bulb), flashing the visual alert 508, changing the color of the visual alert 508, changing a message or symbol displayed by the visual alert 508, etc.

Figure 6:
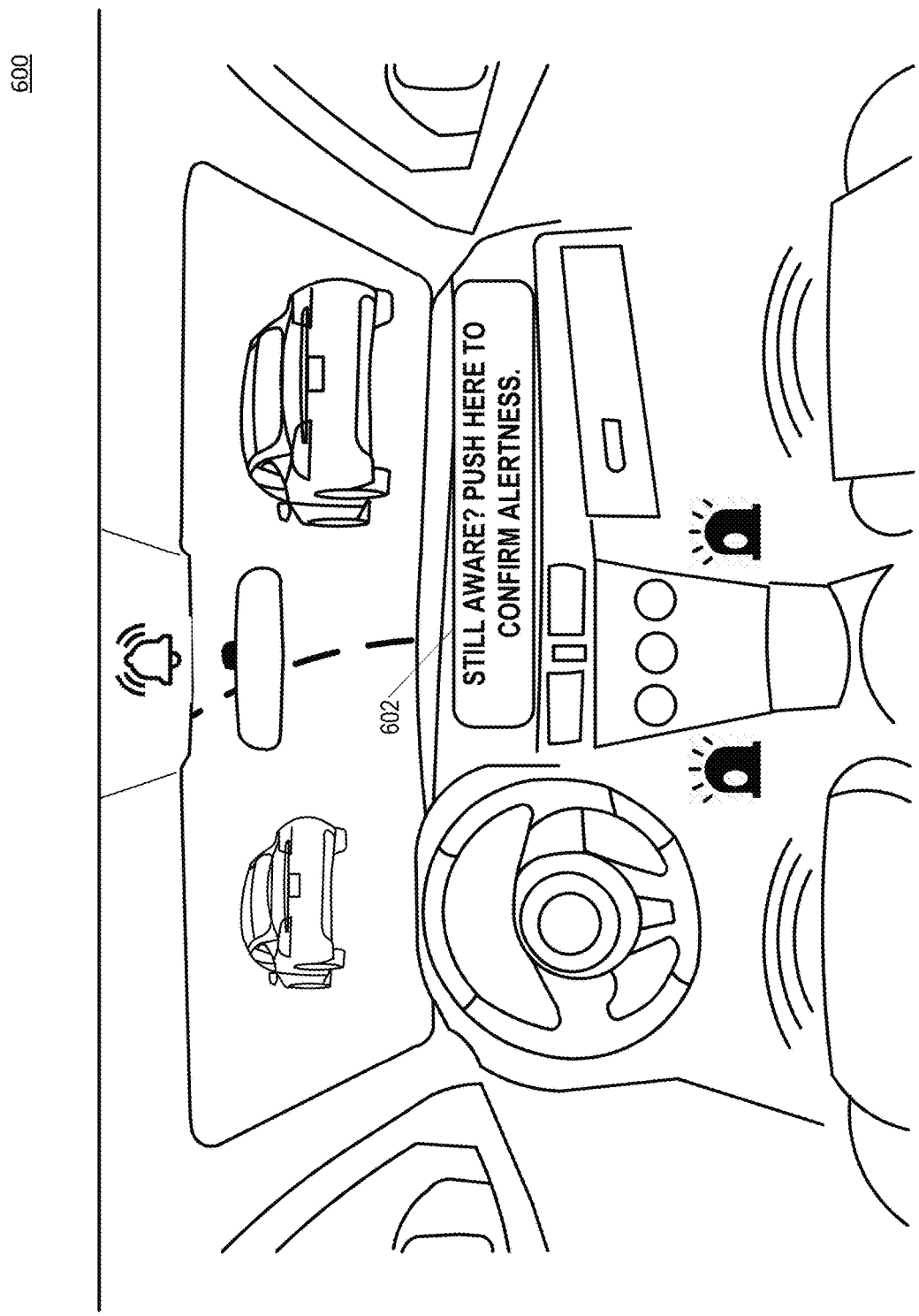
FIG. 6 is an in-vehicle view of an example system for assessing driver ability to react to road conditions and/or accept additional driving responsibilities.

FIG. 6 is an in-vehicle view of an example system 600 for assessing driver ability to react to road conditions and/or accept additional driving responsibilities. The system 600 includes a text notification 602 including request for acknowledgement from the human operator. The text notification 602 may serve as a "ping" to the human operator to test for responsiveness. When a human operator responds to the text notification 602 (e.g., through a touch interface, pushing a button, speaking a response into a microphone, etc.), the system 600 (e.g., a security arbiter on the vehicle) may record a responsiveness time associated with the human operator's acknowledgement of the text notification 602.

An intrusiveness level of the text notification 602 may be varied to test the human operator's reaction to different levels of intrusiveness. Some human operators may react well to minimally intrusive notifications and find more intrusive notifications to be irritating. Other human operators, on the other hand, may not respond well to minimally intrusive notifications and may need more intrusive notifications to respond to a request by the vehicle to assume more driving responsibility.

The push notification 602 includes an instruction for the human operator to push and/or otherwise interact with the notification 602 to confirm an alertness level of the human operator. The human operator's interaction with the notification 602 may serve as an acknowledgement of the request. The human operator's acknowledgement of the notification 602 may be used to adjust a driving capability profile of the human operator. For example, if the human operator exhibits human operator parameters that indicate the human operator is alert and focused on the environment surrounding the vehicle, then the driving capability profile for that human operator may be adjusted to reflect that the human operator tends to respond quickly to notifications if the human operator is alert and focused on the surroundings of the vehicle. On the other hand, if the human operator is focused on another activity, such as reading book, then the human operator's response to the notification 602 may be much slower, and the driving capability profile of the human operator may be adjusted to reflect that the particular human operator responds slowly if the human operator parameters indicate that the human operator is focused on reading a book. Still other human operators may still respond quickly to the notification 602 when engrossed in reading a book, and the driving capability profiles of these human operators are adjusted to reflect their faster response time even though they may be focused on an activity other than monitoring the environment surrounding the vehicle.

Figure 7:
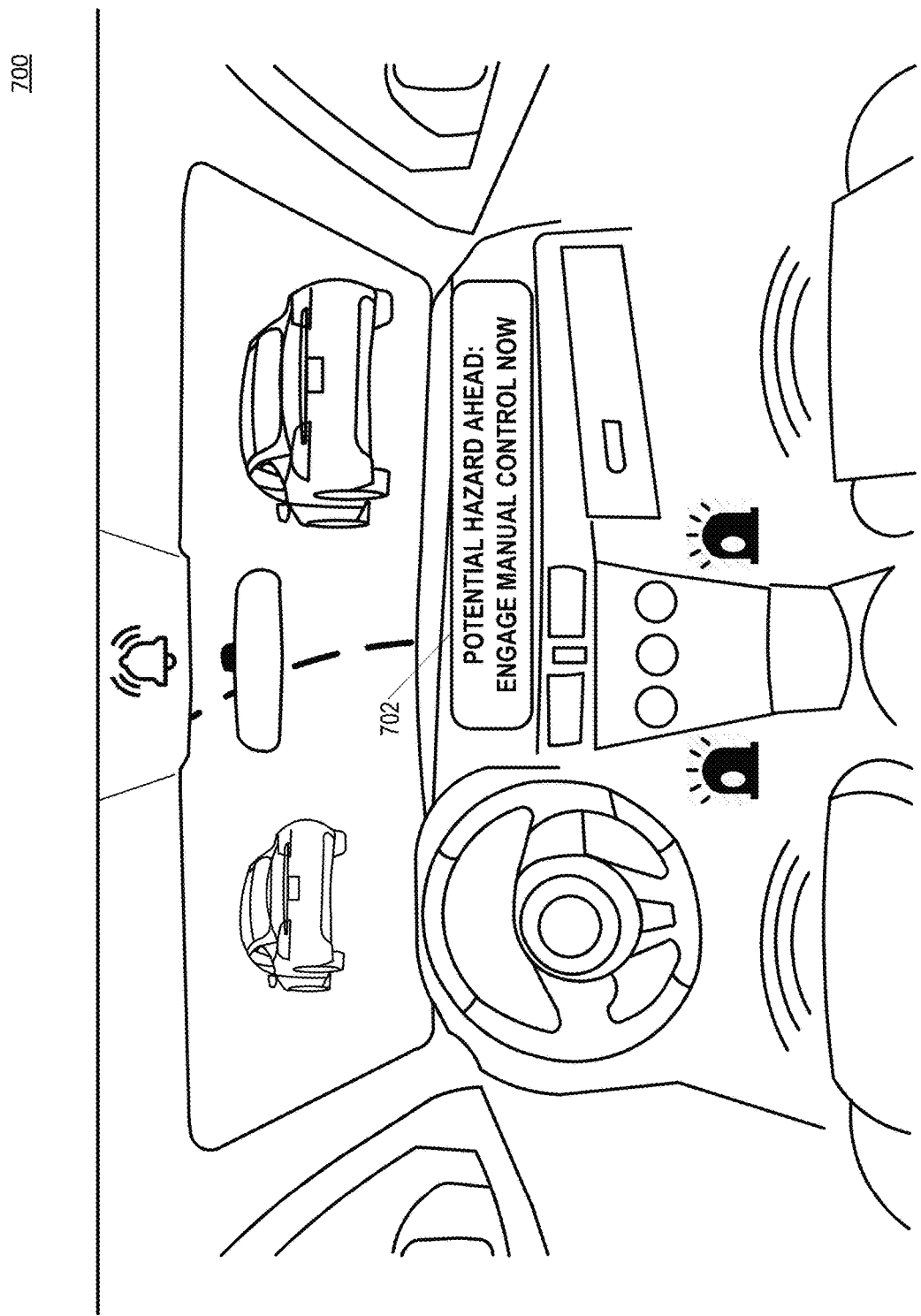
FIG. 7 is an in-vehicle view of an example system for assessing driver ability to react to road conditions and/or accept additional driving responsibilities.

FIG. 7 is an in-vehicle view of an example system 700 for assessing driver ability to react to road conditions and/or accept additional driving responsibilities. The system 700 includes a text display 702 for alerting a human operator of an impending change to autonomous vehicle capabilities of the vehicle. In the implementation illustrated in FIG. 7, the vehicle or another party has determined that an expected road hazard should not be navigated by the vehicle autonomously. Some road hazards (e.g., a rock slide) are very serious and seldom encountered by autonomous vehicle. It may not be known how well an autonomous vehicle is able to navigate such a hazard due to unpredictable conditions and infrequent collection of the behavior of autonomous vehicle in such a situation. In such cases, it may be determined that a human operator must quickly assume control of the vehicle.

The determination that an expected road hazard should not be navigated autonomously may be based on information collected by the vehicle itself or may be reported to the vehicle via a communications interface (e.g., other vehicles in the area may send reports that they are not successfully navigating a road hazard, an insurer may determine that human operators in general or a human operator in particular is more likely to safely navigate a road hazard than a vehicle under autonomous control, etc.). The text notification 702 may be accompanied by other notification methods (e.g., audio signal, haptic feedback, visual signals, etc.). The text notification 702 may further include information such as an expected amount of time until a road hazard will be reached or an expected amount of time until a change to autonomous driving capabilities takes effect. The human operator's response to the text notification 702 may be used to adjust a driving capability profile of the human operator depending on the human operator's response time, human operator parameters at the time of the text notification 702, environmental conditions of the vehicle at the time of the text notification 702, etc.

Figure 8:
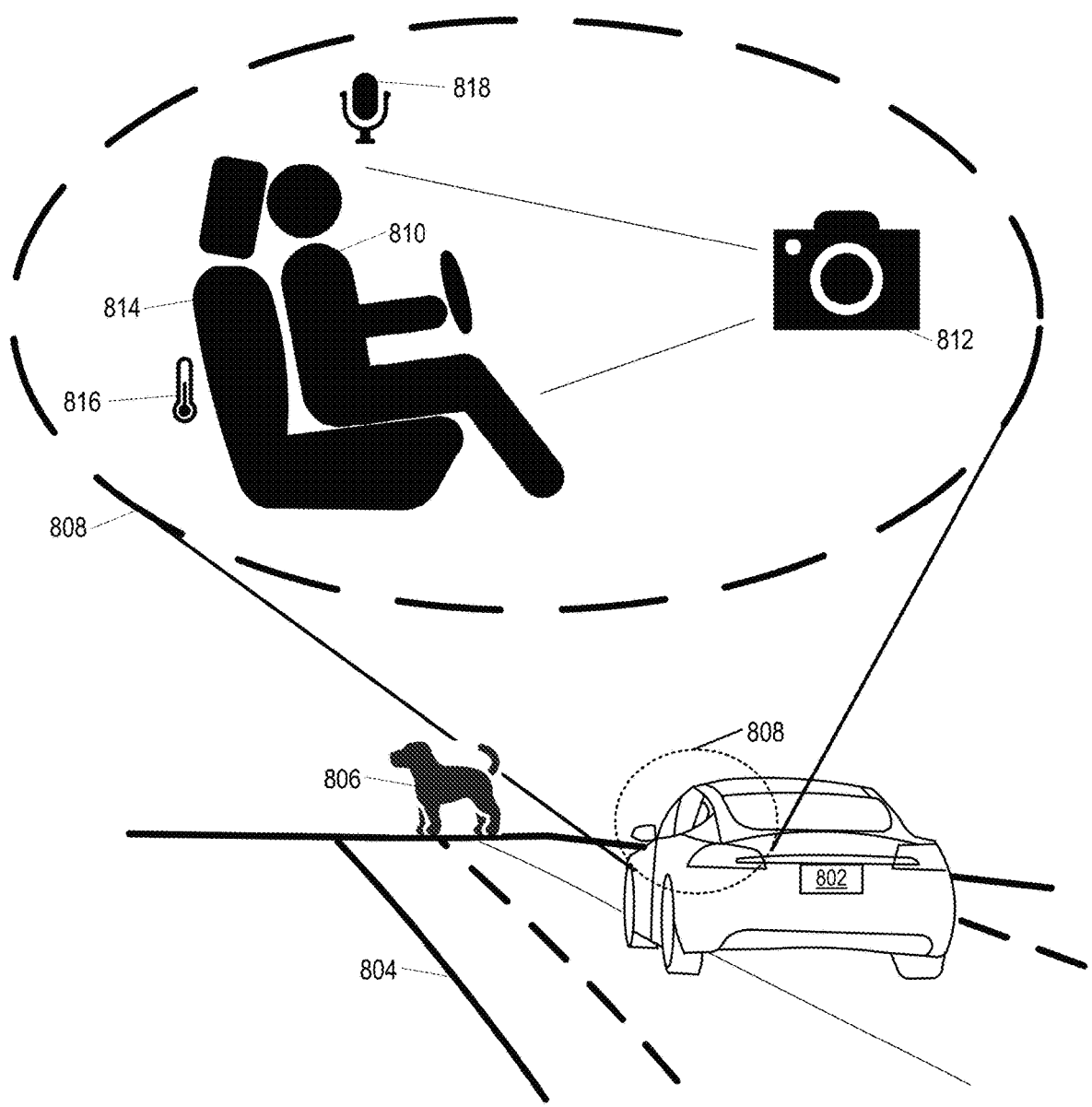
FIG. 8 is a schematic diagram of an example system for assessing driver ability to operate an autonomous vehicle.

FIG. 8 is a schematic diagram of an example system 800 for assessing driver 810 ability to operate an autonomous vehicle 802. The system 800 includes a vehicle 802 with more than one level of autonomous capabilities navigating on a road 804. The vehicle 802 may include one level of pure manual control and one or more additional levels of enhanced automated control. When the vehicle 802 approaches a potential road hazard 806 or other road conditions under which a change in the autonomous capabilities of the vehicle 802 are warranted, the vehicle 802 may display a notification to the human operator 810 to expect an upcoming or immediate change in the responsibilities of the human operator 810 in piloting the vehicle 802.

One factor in determining the type of notification of a change in autonomous capabilities of the vehicle 802 to the human operator 810 is the current state of the human operator 810. An alertness level of the human operator 810 may be estimated based on objective data collected by sensors inside the vehicle 802 such as the sensors shown in the bubble 808 of the interior of the vehicle 802. In one implementation, an optical imaging device 812 (e.g., a camera) is located inside the vehicle 802 and is directed towards the human operator 810. The camera 812 may capture images of the human operator 810 that may be analyzed to extract human operator parameters used to determine an alertness state of the human operator.

In at least one implementation, the human operator parameters include a body position of the human operator 810. If the human operator 810 is sitting upright in the seat 814 and has her hands on or near a steering wheel, it is likely that the human operator 810 will be more responsive to a change in driving responsibilities than if the human operator 810 is reclined in the seat 814 without hands near the steering wheel. Images captured by the camera 812 may be analyzed by components of the vehicle 802 to determine whether the human operator is in a body position that indicates a greater or lower level of alertness. The camera 812 may capture a series of images of the human operator 810 (e.g., a video) that may be compared by components of the vehicle 802 to determine an activity level of the human operator 810. For instance, if the human operator 810 is asleep, then she will likely exhibit a different movement patterns than a human operator 810 who is awake. Another type of objective data that may be collected by the camera 812 regarding the human operator's alertness and preparedness for accepting a change in driving responsibilities is the activity in which the driver is engaged. If analysis of images captured by the camera 812 indicate that the human operator 810 is holding a book or electronic device, for example, then the human operator 810 is more likely to experience a slower change of focus away from the book and to road conditions than a human operator 810 who is not holding a book or electronic device. The camera 812 may also capture images of the face of the human operator 810 to determine whether her eyes are open or closed, focused on the environment outside of the vehicle 802 or inside the vehicle 802 and other factors such as fatigue.

Figure 9:
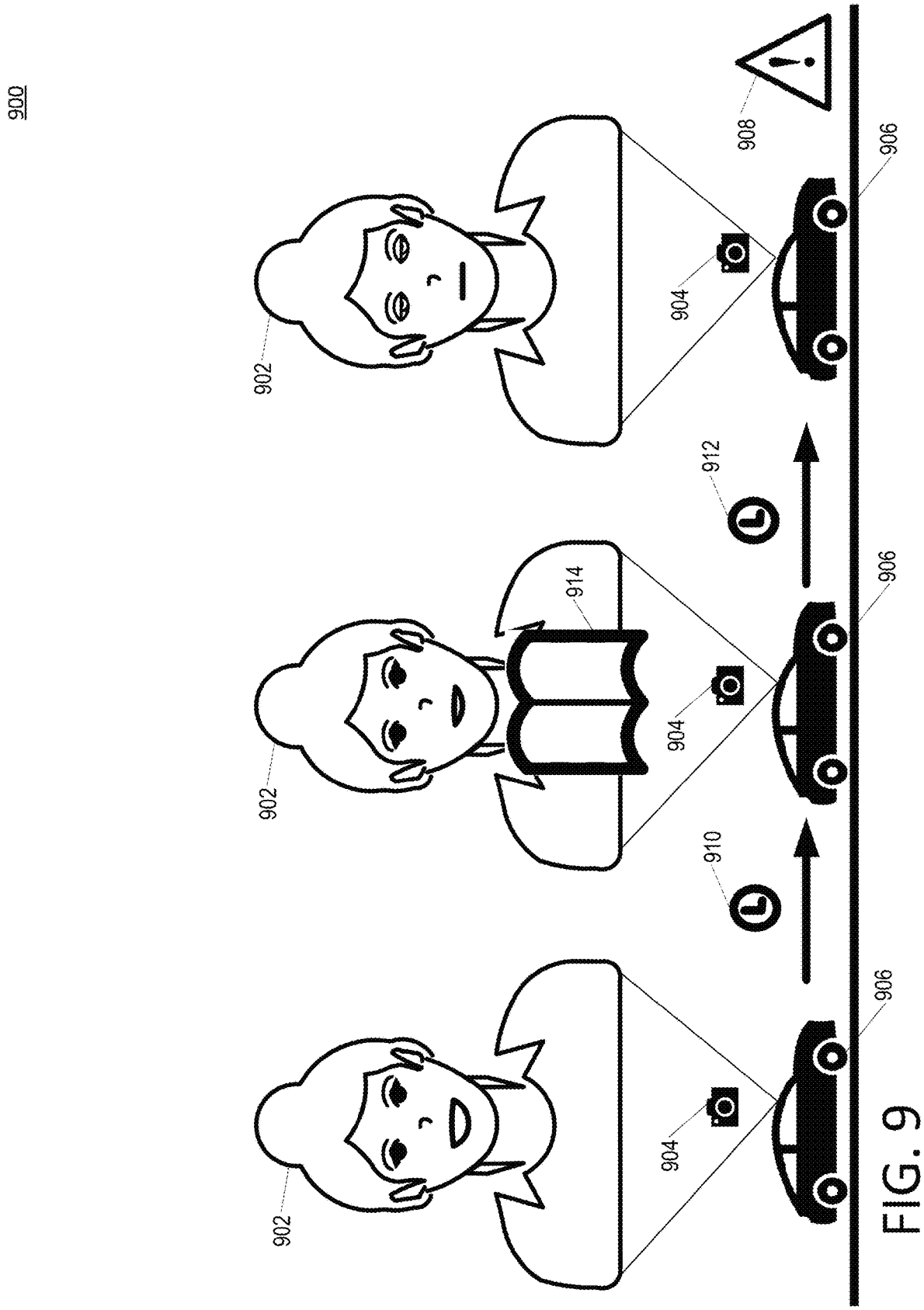
FIG. 9 is a schematic diagram of an example system for assessing driver ability to operate an autonomous vehicle.

FIG. 9 is a schematic diagram of an example system 900 for assessing driver ability to operate an autonomous vehicle. The vehicle 906 includes an image capture device 904 such as a camera. The camera may be directed towards the face of the human operator 902 and images captured thereof. Components of the vehicle 906 may analyze the images of the face of the human operator 902 to identify characteristics of the human operator 902 that are relevant to the human operator parameters used to determine an alertness level of the human operator 902.

The camera 904 may analyze various features of the human operator 902 to supply human operator parameters to the vehicle 906. For example, in a time period before time 910, the eyes of the human operator 902 are open and focused outside the window of the vehicle 906. The camera 904 may capture a series of images of the face of the human operator 902 to detect other features such as rapidity of eye movement, dilation of eye pupils, blinking, etc.

In a time period after time 910, the camera may capture more images of the face of the human operator 902. In a time period after time period 910, the eyes of the human operator 902 are still open, but are focused on a book 914. Images captured by the camera 904 may reflect that the eyes of the human operator 902 are no longer focused on the environment surrounding the vehicle 906, but instead are focused on the book 914. Images captured by the camera 904 may record features of the eyes of the human operator 902 such as eye movements indicating a speed at which the human operator 902 is reading. Slower reading speeds and other eye movements may indicate a fatigue level of the human operator 902.

If the eyes of the human operator 902 are no longer focused on the environment surrounding the vehicle, human operator parameters may include a level of distraction represented by a "score." For example, if the human operator 902 is focused on a book 914, it may be likely that the human operator is engaging in an extended period of perhaps intense concentration on the book 914. The longer the human operator 902 focuses on the book 914, the more likely she is to have a higher level of detachment from her environment. Such behavior may indicate that the human operator parameters should reflect a higher level of distraction. A security arbiter in the vehicle 906 may set a relatively longer period of time that would be expected before the human operator 902 responds to a notification of change to driving responsibility based on a higher distraction score in the human operator parameters. On the other hand, if the human operator 902 is only occasionally focusing on a handheld device (e.g., checking email, etc.), then the distraction of the human operator 902, while still present, may not be considered as distracted as long periods of reading a book 914. In such a case, a lower environmental detachment score may be included in the human input parameters and relied on by other components of the vehicle 906 to alert the human operator 902 of an impending change in driving responsibility and management of shifting the vehicle from one level of autonomous control to another.

At a time period after time 912, the camera 904 may capture additional images of the face of the human operator 902 that indicate the human operator 902 is suffering from fatigue. Images captured by the camera 904 may show that that eye lids of the human operator 902 are not as open as before the human operator 902 began experiencing fatigue. Other eye-based indications include blinking rate, location of eye focus, and eye movement rapidity.

The human operator parameters collected by the camera 904 are used to determine an alertness level of the human operator 902. The determined alertness level may be used to determine whether a change should be made to the autonomous capability level of the 906 and whether the human operator 902 should take on more or less driving responsibility. If the vehicle 906 determines that an approaching road hazard 908 exists and the human operator 902 should take on more driving responsibility, then the vehicle 906 may display a notification to the human operator 902. The type of notification displayed to the human operator 902 and the time period for which the notification should be displayed in advance of an encounter with the road hazard 908 depend on the alertness level of the human operator 902 and the human operator parameters sensed by components of the vehicle 906. For example, if the human operator 902 has a higher alertness level, such as in the time period before time 910, then the notification of a change to the vehicle's autonomous capabilities may be less intrusive or occur closer to a road hazard because it is expected that the human operator 902 will be able to recognize the notification and increase driving responsibility relatively quickly. On the other hand, if an alertness of the human operator 902 is lower due to human operator parameters such as those examples after time 910 and after time 912 (e.g., occupied with another task, experiencing fatigue, etc.), then the notification of a change to the vehicle's autonomous capabilities may be more intrusive or occur farther away from the road hazard because it is expected that the human operator 902 will need relatively more time to recognize the notification and prepare to increase driving responsibility.

Figure 10:
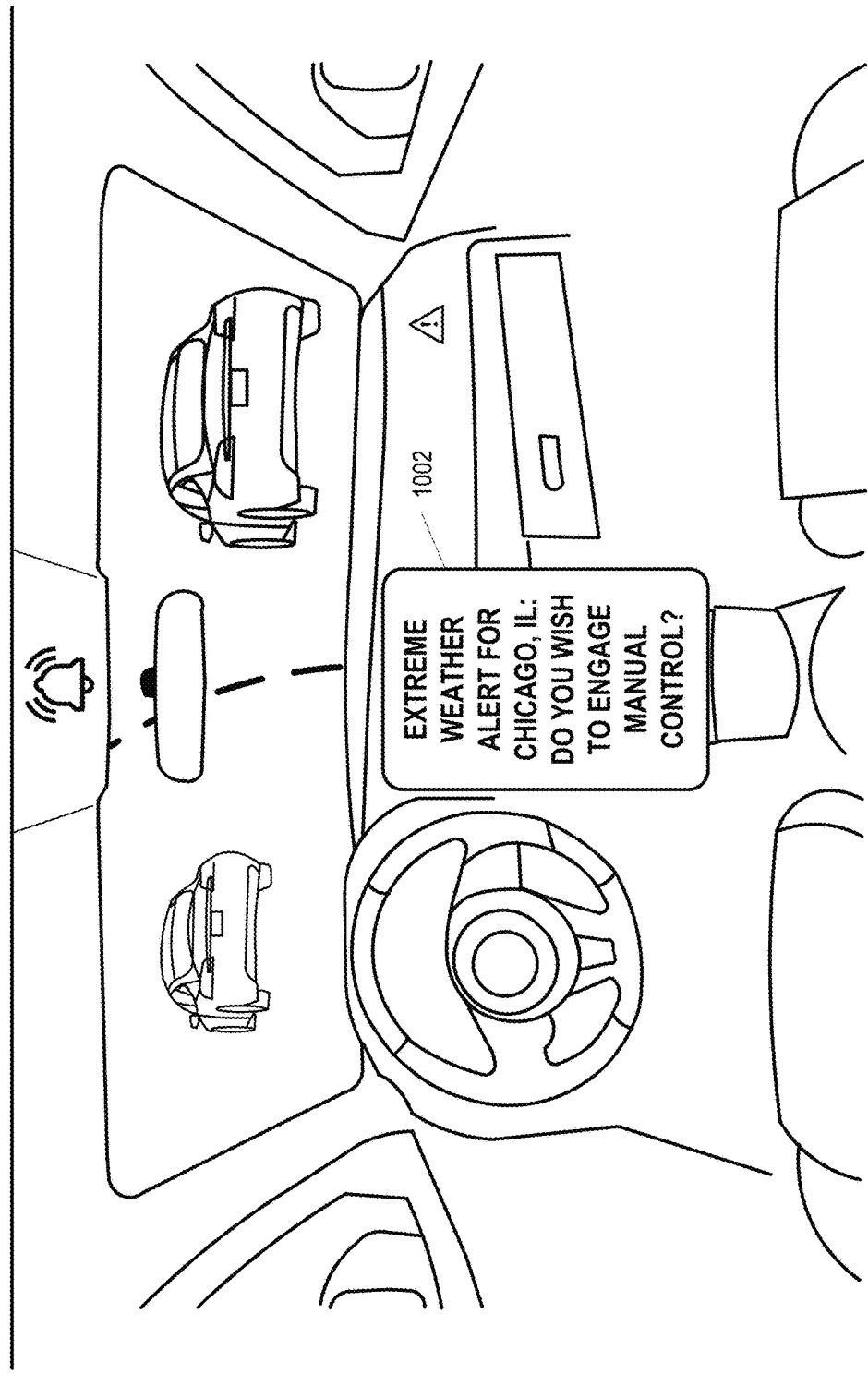
FIG. 10 is an in-vehicle view of an example system for assessing driver ability to react to road conditions and/or accept additional driving responsibilities.

FIG. 10 is an in-vehicle view of an example system 1000 for assessing driver ability to react to road conditions and/or accept additional driving responsibilities. In the implementation illustrated in FIG. 10, a notification 1002 includes a request to the human operator to adjust the level of autonomous control exercised by the vehicle. In some situations, the vehicle may determine or a third party may determine, that a vehicle is likely to be navigated more safely autonomously than by the human operator. Examples of third party entities that may make such a determination include a vehicle manufacturer, a government agency, an insurer, a vehicle owner, etc. The vehicle or the third parties may also determine that a vehicle is likely to be operated more safely manually than autonomously in certain situations. In the example illustrated in FIG. 10, an extreme weather alert issued from a weather service initiates a request to the human operator to agree to allow the vehicle reduce or eliminate autonomous capabilities in favor of manual control. A human operator may interact with the notification 1002 directly or by other controls in the interior of the vehicle to accept the request presented in notification 1002.

The display of notification 1002 may be conditioned on a driving capability profile of the human operator of the vehicle in comparison to human operator parameters detected by the vehicle and/or the environmental risk profile of the vehicle. For example, if the driving capability profile of a human operator of the vehicle indicates that the driver has a poor level of skill in extreme weather conditions, then the arbiter may determine that it is safer if the vehicle navigates the extreme weather autonomously rather than under manual control of the human operator.

Figure 11:
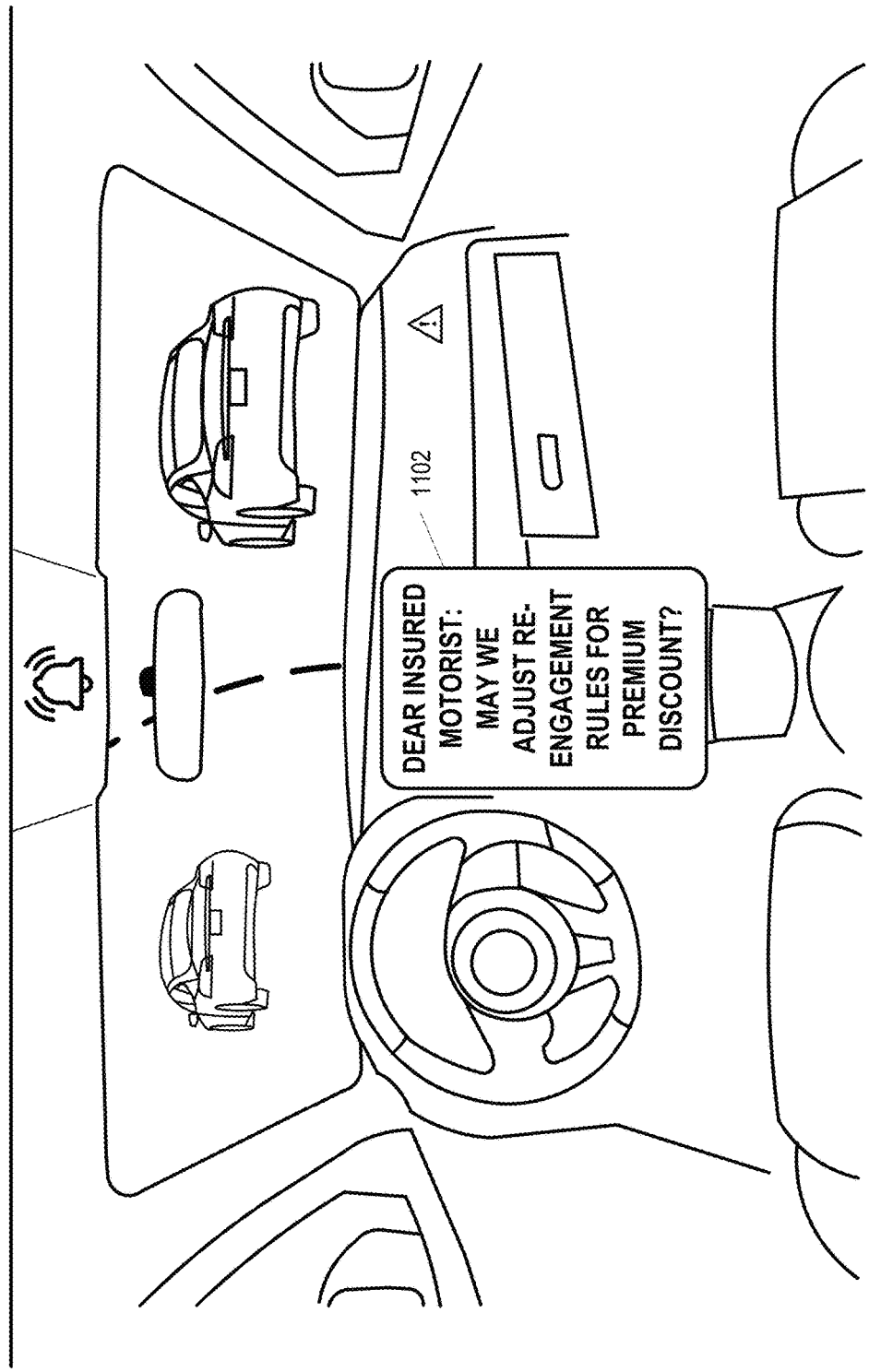
FIG. 11 is an in-vehicle view of an example system for assessing driver ability to react to road conditions and/or accept additional driving responsibilities.

FIG. 11 is an in-vehicle view of an example system 1100 for assessing driver ability to react to road conditions and/or accept additional driving responsibilities. In at least one implementation, an insurer determines whether a human operator or a vehicle is more likely to safely navigate the vehicle in certain conditions. The insurer initiates a request to the human operator to be displayed as notification 1102. The notification 1102 may include an offer from an insurer to lower insurance premium prices in return for the human operator's agreement to allow the vehicle to assume a greater or lesser degree of autonomous control over road navigation depending on the rules preferred by the insurer. Rules preferred by the insurer may depend on factors such as the human operator parameters measured inside the vehicle, the driving capability profile of the particular human operator in the vehicle, and data gathered regarding events outside the vehicle.

In one implementation, the notification 1102 is an in-vehicle notification requesting adjustment based on factors such as the human operator's driving capability profile, human operator parameters, and potential road hazards. The in-vehicle notification 1102 may therefore be an on-demand change to the vehicle's autonomous capabilities based on changing conditions. In another implementation, the notification 1102 is not an in-vehicle notification, and may be based on an analysis of the human operator's driving capability profile and other information relating to the driver. In yet another implementation, the notification 1102 indicates that current insurance coverage no longer covers the vehicle in case of a crash due to an increased risk as determined based on current human operator parameters, driving capability profile, and/or road conditions. If current insurance no longer covers the human operator, the notification 1102 may display an offer for the human operator to make a one-time (or recurring) additional premium payment to continue insurance coverage. In at least one implementation, the vehicle may cease navigation if the human operator no longer has insurance coverage and declines to pay an additional premium to continue coverage. In another implementation, the additional premium payment may be variable based on a level of autonomous capability of the vehicle agreed to by the human operator.

Figure 12:
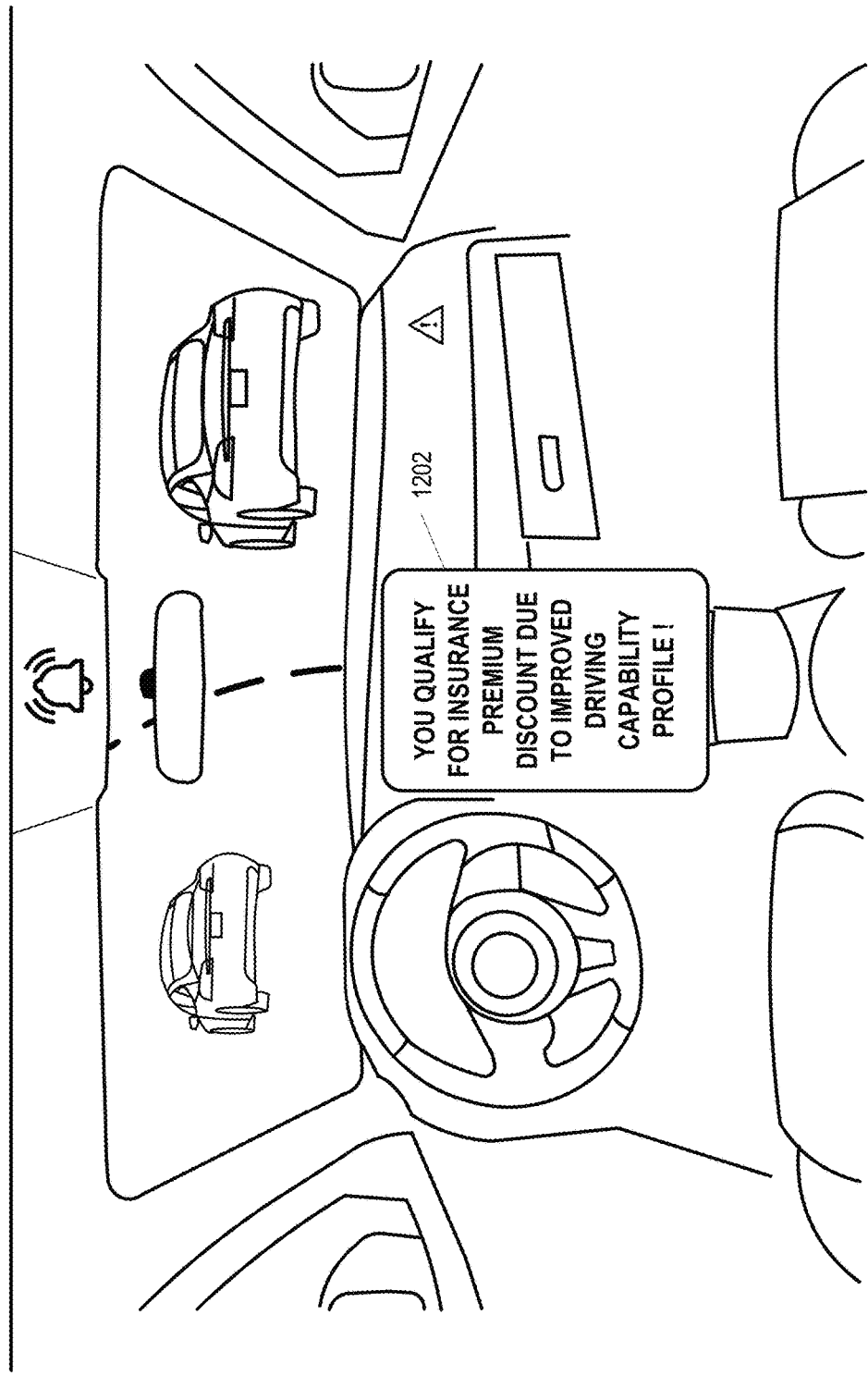
FIG. 12 is an in-vehicle view of an example system for assessing driver ability to react to road conditions and/or accept additional driving responsibilities.

FIG. 12 is an in-vehicle view of an example system 1200 for assessing driver ability to react to road conditions and/or accept additional driving responsibilities. The system 1200 includes a text notification 1202 indicating that the human operator qualifies for a reduced insurance premium cost due to an improved driving capability profile. If human operators are aware that there is a driving capability profile describing their driving skills in various situations and that an insurer may rely on the driving capability profile to set insurance premium costs, especially for insuring an autonomous vehicle, then the human operators may attempt to increase their skill level reflected in their driving capability profiles.

Figure 13:
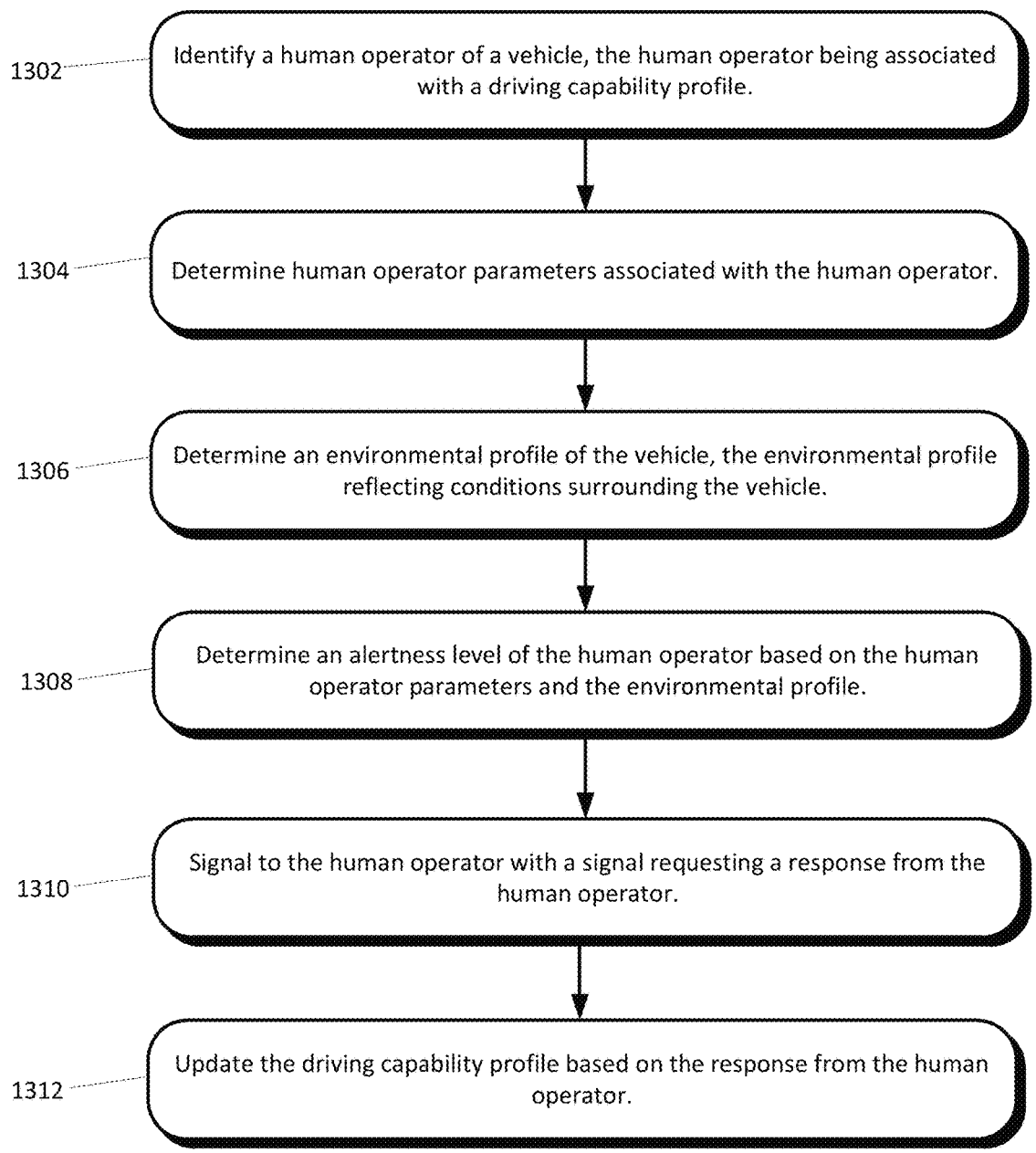
FIG. 13 illustrates example operations for assessing driver ability to operate an autonomous vehicle.

FIG. 13 illustrates example operations 1300 for assessing driver ability to operate an autonomous vehicle. An identifying operation 1302 identifies a human operator of a vehicle wherein the human operator has a driving capability profile. The human operator's driving capability profile may be based on multiple factors including without limitation the results of a skill test of the human operator, a history of the human operator's prior responses to notifications of a change of a change to the vehicle's autonomous capabilities (especially response time and quality to notifications that the human operator should assume a greater degree of driving responsibility), typical usage patterns and locations of the human operator, an insurance coverage amount of the vehicle, etc. In one implementation, the identifying operation 1302 includes identifying the human operator via sensors inside the vehicle (e.g., a camera with facial recognition of the human operator).

A determining operation 1304 determines human operator parameters associated with the human operator. The determining operation 1304 may include sensors inside the vehicle to collect biometric data regarding the human operator (e.g., camera, heart rate sensor, perspiration sensor, steering wheel grip force sensor, body temperature sensor, movement sensors, microphones, etc.). The determining operation 1304 may also rely on information about the human operator stored by the vehicle or communicated to the vehicle such as demographic information regarding the human operator (age, gender, length of driving experience, etc.) and historical information regarding the human operator's usage of the vehicle.

A determining operation 1306 determines an environmental profile of an environment of the vehicle. The environmental profile may be based on a number of available factors including information received from other vehicles operating on the same road (e.g., vehicle crash information, road hazard information, emergency control reports, traffic density information regarding the road, etc.), information received from an entity monitoring the road (e.g., a government agency, insurer, etc.), and/or information detected by the vehicle itself (e.g., outside weather and temperature conditions, traffic density, etc.). In one implementation, the environmental risk profile includes whether and how many other vehicles on the same road are able to communicate with one another, especially whether the other vehicles on the road are able to communicate emergency signals to other vehicles and to respond to emergency signals received from other vehicles. If a significant portion of the vehicles travelling on a road together are able to share emergency information with one another, then there is a reduced likelihood of a vehicle crash and subsequent liability for an insurer. Also liability could be reduced where all vehicles respond similarly to a road hazard (e.g., when applying a legal standard of reasonable precautions).

Another determining operation 1308 determines an alertness level of the human operator based on the human operator parameters and the driving capability profile. The determining operation 1308 may include a determination of an amount of time the human operator is likely to need to respond to notifications of various levels of intrusiveness.

A signaling operation 1310 signals to the human operator with a signal requesting a response from the human operator. In at least one implementation, the signal is a text notification displaying a message to the human operator in the interior of the vehicle. In other implementations, the signal includes haptic feedback, video, audio, and/or other types of signaling. An updating operation 1312 updates a driving capability profile based on a response from the human operator to the signaling operation 1310. The updating operation 1312 may depend at least in part on the environmental profile and the human operator parameters at the time of the signaling operation 1310 to update the driving capability profile. For example, if the human operator exhibits human operator parameters that indicate the human operator is not focused on the conditions surrounding the vehicle, then any response to the signaling operation 1310 will reflect the human operator's propensity and level of skill in switching focus from the object of the human operator's attention (e.g., electronic device, book, etc.) to the road and preparations for potentially taking control of the vehicle.

Figure 14:
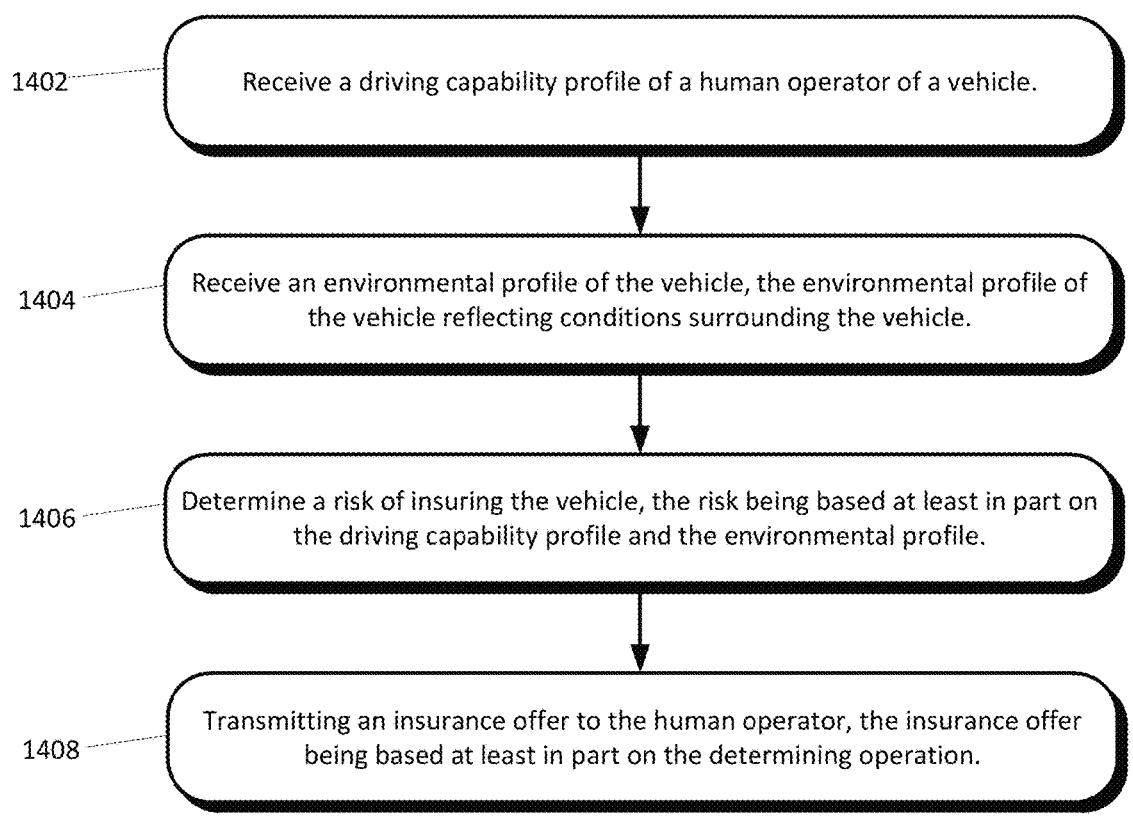
FIG. 14 illustrates example operations assessing driver ability to operate an autonomous vehicle.

FIG. 14 illustrates example operations 1400 assessing driver ability to operate an autonomous vehicle. A receiving operation 1402 receives a driving capability profile of a human operator of a vehicle. The driving capability profile of the human operator may be stored on-board a vehicle or it may be transmitted from a third party (e.g., a government agency, a driver assessment entity, an insurer, etc.). A receiving operation 1404 receives an environmental profile of a vehicle. The environmental profile may be based on a number of available factors including information received from other vehicles operating on the same road (e.g., vehicle crash information, road hazard information, emergency control reports, traffic density information regarding the road, etc.), information received from an entity monitoring the road (e.g., a government agency, insurer, etc.), and/or information detected by the vehicle itself (e.g., outside weather and temperature conditions, traffic density, etc.). In one implementation, the environmental risk profile includes whether and how many other vehicles on the same road are able to communicate with one another, especially whether the other vehicles on the road are able to communicate emergency signals to other vehicles and to respond to emergency signals received from other vehicles. If a significant portion of the vehicles travelling on a road together are able to share emergency information with one another, then there is a reduced likelihood of a vehicle crash and subsequent liability for an insurer. Also liability could be reduced where all vehicles respond similarly to a road hazard (e.g., when applying a legal standard of reasonable precautions).

A determining operation 1406 determines a risk of insuring the vehicle, the risk being based at least in part on the driving capability profile and the environmental profile. The risk of insuring the vehicle may be extended to various periods of time. For example, if the combination of the driving capability profile and the environmental risk profile indicates that the human operator will fare poorly in expected snow road conditions, but that the snow road conditions will only persist for a short time until the vehicle reaches its destination, then the risk of insuring the vehicle may extend only for the duration of the trip. On the other hand, the risk of insuring the vehicle may extend indefinitely and may be based on the driving capability profile and a historical assessment of all environmental profiles the vehicle is likely to encounter while being used by the human operator. The determining operation may further be based on human operator parameters detected during the operations 1400. For example, if human operator parameters indicate that the human operator is experiencing a level of intoxication that is likely to impair the human operator's driving capabilities compared to the human operator's non-intoxicated driving capabilities, then the determining operation 1406 may extend only to a period of time when the human operator is expected to remain intoxicated.

A transmitting operation 1408 transmits an insurance offer to the human operator or to another entity with an interest in the vehicle, the insurance offer being based at least in part on the determining operation 1406. The insurance offer may extend only to a time period during which the determining operation 1406 is valid (e.g., for as long as the risk is expected to remain at the level determined by the determining operation 1406).

Of course, the applications and benefits of the systems, methods and techniques described herein are not limited to only the above examples. Many other applications and benefits are possible by using the systems, methods and techniques described herein.

Furthermore, when implemented, any of the methods and techniques described herein or portions thereof may be performed by executing software stored in one or more non-transitory, tangible, computer readable storage media or memories such as magnetic disks, laser disks, optical discs, semiconductor memories, biological memories, other memory devices, or other storage media, in a RAM or ROM of a computer or processor, etc.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

What is claimed:

1. A method of assessing driver capability for operating an autonomous vehicle, the method comprising:
   identifying, by one or more processors, a human operator of the autonomous vehicle, the human operator being associated with a driving capability profile;
   signaling, by the one or more processors, to the human operator with a signal, the signal requesting a response from the human operator; and
   updating, by the one or more processors, based on the response from the human operator to the signal, the driving capability profile to indicate a level of alertness of the human operator.

2. The method of claim 1, further comprising:
   determining, by the one or more processors prior to the signaling, human operator parameters associated with the human operator of the autonomous vehicle,
   wherein updating the driving capability profile is further based on the human operator parameters.

3. The method of claim 2, wherein determining the human operator parameters includes:
   determining whether eyes of the human operator are focused on an object inside the autonomous vehicle.

4. The method of claim 1, wherein updating the driving capability profile includes updating the driving capability profile to indicate a level of skill of the human operator at responding to the signal at the level of alertness.

5. The method of claim 1, wherein the signal is a first signal, the method further comprising:
   detecting, by the one or more processors, that an autonomous capability of the autonomous vehicle is to change; and
   in response to the detecting, signaling, by the one or more processors, based on the driving capability profile, to the human operator with a second signal.

6. The method of claim 5, wherein the signaling to the human operator with the second signal is further based on the level of alertness.

7. The method of claim 1, further comprising:
   determining, by the one or more processors, an environmental profile of the autonomous vehicle, the environmental profile reflecting conditions surrounding the autonomous vehicle,
   wherein updating the driving capability profile is further based on the environmental profile.

8. The method of claim 7, wherein the environmental profile of the autonomous vehicle includes one or more of weather conditions or daylight conditions.

9. The method of claim 1, wherein updating the driving capability profile to indicate the level of alertness comprises:
   updating the driving capability profile to indicate an amount of time between the signaling operation and the response from the human operator.

10. The method of claim 1, wherein updating the driving capability profile is further based on at least one of a type of response from the human operator or a type of signal used by the signaling operation.

11. A computer system for assessing driver capability for operating an autonomous vehicle, the computer system comprising:
    one or more processors; and
    a non-transitory computer-readable memory coupled to the one or more processors and storing instructions thereon that, when executed by the one or more processors, cause the computer system to:
       identify a human operator of the autonomous vehicle, the human operator being associated with a driving capability profile;
       signal to the human operator with a signal, the signal requesting a response from the human operator; and
       update, based on the response from the human operator to the signal, the driving capability profile to indicate a level of alertness of the human operator.

12. The computer system of claim 11, wherein the instructions further cause the computer system to:
    determine, prior to the signaling, human operator parameters associated with the human operator of the autonomous vehicle,
    wherein updating the driving capability profile is further based on the human operator parameters.

13. The computer system of claim 12, wherein the instructions cause the computer system to determine the human operator parameters by:
    determining whether eyes of the human operator are focused on an object inside the autonomous vehicle.

14. The computer system of claim 11, wherein the instructions causing the computer system to update the driving capability profile include updating the driving capability profile to indicate a level of skill of the human operator at responding to the signal at the level of alertness.

15. The computer system of claim 11, wherein the signal is a first signal, and the instructions further cause the computer system to:
    detect that an autonomous capability of the autonomous vehicle is to change; and
    in response to the detecting, signal, based on the driving capability profile, to the human operator with a second signal.

16. The computer system of claim 15, wherein the signaling to the human operator with the second signal is further based on the level of alertness.

17. The computer system of claim 11, wherein the instructions further cause the computer system to:
    determine an environmental profile of the autonomous vehicle, the environmental profile reflecting conditions surrounding the autonomous vehicle,
    wherein updating the driving capability profile is further based on the environmental profile.

18. The computer system of claim 17, wherein the environmental profile of the autonomous vehicle includes one or more of weather conditions or daylight conditions.

19. The computer system of claim 11, wherein the instructions cause the computer system to update the driving capability profile to indicate the level of alertness by:
- updating the driving capability profile to indicate an amount of time between the signaling operation and the response from the human operator.

20. A method of insuring an autonomous vehicle against loss, the method comprising:
- receiving, by one or more processors, a driving capability profile of a human operator of the autonomous vehicle;
- receiving, by the one or more processors, a response from the human operator to a signal, the signal presented to the human operator and requesting a response from the human operator;
- updating, by the one or more processors, based on the response from the human operator to the signal, the driving capability profile to indicate a level of alertness of the human operator;
- determining, by the one or more processors, a risk of insuring the autonomous vehicle, the risk being based at least in part on the updated driving capability profile; and
- transmitting, by the one or more processors, an insurance offer to an electronic device associated with the human operator, the insurance offer being based at least in part on the determined risk of insuring the autonomous vehicle.

* * * * *